(12) United States Patent
Akatsuka

(10) Patent No.: US 12,110,841 B2
(45) Date of Patent: Oct. 8, 2024

(54) SUPERSONIC AIRCRAFT AND METHOD OF REDUCING SONIC BOOMS AND JET NOISE

(71) Applicant: JAPAN AEROSPACE EXPLORATION AGENCY, Tokyo (JP)

(72) Inventor: Junichi Akatsuka, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 229 days.

(21) Appl. No.: 17/652,054

(22) Filed: Feb. 22, 2022

(65) Prior Publication Data
US 2022/0268236 A1 Aug. 25, 2022

(30) Foreign Application Priority Data

Feb. 24, 2021 (JP) .................................. 2021-027126
Feb. 3, 2022 (JP) .................................. 2022-015476

(51) Int. Cl.
*F02K 1/44* (2006.01)
*B64C 5/02* (2006.01)
(Continued)

(52) U.S. Cl.
CPC .................. *F02K 1/44* (2013.01); *B64C 5/02* (2013.01); *B64C 30/00* (2013.01); *B64D 33/06* (2013.01);
(Continued)

(58) Field of Classification Search
CPC ......... B64C 30/00; B64C 23/04; B64D 33/06; F02K 1/34; F02K 1/44; F02K 1/12; F02K 1/42; F02K 1/46
See application file for complete search history.

(56) References Cited

U.S. PATENT DOCUMENTS

| 9,976,515 B2 | 5/2018 | Akatsuka et al. |
| 2008/0060343 A1* | 3/2008 | Narayanan ............. B64D 33/06 60/39.5 |

(Continued)

FOREIGN PATENT DOCUMENTS

| CN | 112502853 A * | 3/2021 | ............. B64D 27/16 |
| JP | 2012-106726 A | 6/2012 | |

(Continued)

OTHER PUBLICATIONS

Bridges, J. "Noise Measurements of a Low-Noise Top-Mounted Propulsion Installation for a supersonic airliner," AIAA SciTech Forum, pp. 1-19, Jan. 7-11, 2019.
(Continued)

*Primary Examiner* — Brady W Frazier
*Assistant Examiner* — Shanna Danielle Glover
(74) *Attorney, Agent, or Firm* — Saliwanchik, Lloyd & Eisenschenk

(57) ABSTRACT

Provided is a supersonic aircraft including: a shield that shields an engine exhaust flow discharged from a jet engine accommodated in an engine nacelle mounted on a fuselage of the aircraft to thereby reduce sonic booms due to the engine exhaust flow; and an exhaust nozzle that is provided in an exhaust port of the engine nacelle and that generates a sound source for high-frequency components at a position at which the shield is capable of shielding the high-frequency components of the engine exhaust flow, to thereby reduce jet noise having the high-frequency components, and promotes mixing of the engine exhaust flow that generates low-frequency noise components with an external air flow to thereby reduce jet noise having the low-frequency components.

17 Claims, 27 Drawing Sheets

(51) Int. Cl.
*B64C 30/00* (2006.01)
*F02K 1/12* (2006.01)
*F02K 1/34* (2006.01)
*F02K 1/42* (2006.01)
*F02K 1/46* (2006.01)

(52) U.S. Cl.
CPC .............. *F02K 1/12* (2013.01); *F02K 1/42* (2013.01); *F02K 1/46* (2013.01); *F05D 2220/80* (2013.01); *F05D 2260/96* (2013.01)

(56) References Cited

U.S. PATENT DOCUMENTS

| | | | |
|---|---|---|---|
| 2012/0119023 A1 | 5/2012 | Moore et al. | |
| 2013/0017065 A1* | 1/2013 | Webster | F02K 1/1207 415/148 |
| 2015/0048177 A1 | 2/2015 | Akatsuka et al. | |
| 2021/0031935 A1* | 2/2021 | Ueno | B64D 29/04 |

FOREIGN PATENT DOCUMENTS

| | | |
|---|---|---|
| JP | 6183837 B2 | 8/2017 |
| JP | 2019-182125 A | 10/2019 |

OTHER PUBLICATIONS

Akatsuka, J. et al., "Experimental and Numerical Study of Jet Noise Reduction for Supersonic Aircraft Using Variable Folding Nozzle Concept," AIAA Aviation Forum, pp. 1-12, Jun. 25-29, 2018.

The Japan Aerospace Exploration Agency, "Supplement Ex-Post Evaluation Related to Research and Development of Silent Super Sonic Technology", [online], Jul. 28, 2020, the Ministry of Education, Culture, Sports, Science and Technology, distributed document by the Aviation Technology Committee (66th) [searched on Jan. 26, 2021], Internet <https://www.mext.go.jp/b_menu/shingi/gijyutu/gijyutu2/004/shiryo/1422978_00003.htm>.

* cited by examiner

FIG.18 Comparison of 1/3 octave band SPL: (a) θ=90°, (b) θ=160°.

Distribution of the OASPL difference in nozzle design space : (a) $\theta = 90°$, (b) $\theta = 120°$, (c) $\theta = 160°$.

TKE contours in the streamwise direction.

TKE contours of x/D=1.

SUPERSONIC AIRCRAFT AND METHOD OF REDUCING SONIC BOOMS AND JET NOISE

CROSS REFERENCE TO RELATED APPLICATIONS

This application claims the benefit of Japanese Application Nos. 2021-027126, filed Feb. 24, 2021; and 2022-015476, filed Feb. 3, 2022; the entire contents of which are incorporated herein by reference.

BACKGROUND

The present technology relates to a supersonic aircraft such as a supersonic passenger aircraft and a method of reducing sonic booms and jet noise of such a supersonic aircraft.

When a supersonic aircraft flies supersonically in the sky above, shock waves generated from the respective parts of the airframe integrate as they propagate long distances in the atmosphere, and are observed over land as N-type pressure signatures that cause two abrupt pressure fluctuations, which are audible to humans as instantaneous explosive sounds. It is generally called "sonic boom". Concorde, retired in 2003, had not been permitted to fly over land at supersonic speed due to the sonic boom and its flights had been restricted only to flights over water, and the sonic boom is an important technical problem for realizing future supersonic passenger aircraft.

Besides the reduction of sonic booms, reduction of jet noise during the take-off and landing at the airport is also one of major challenges for the environmental compatibility of the supersonic aircraft. Establishment of standards for both has been discussed in the International Civil Aviation Organization (ICAO), and achieving low take-off and landing noise and low sonic booms is essential for commercial supersonic aircraft to newly enter the market. Regarding the noise of the supersonic aircraft during the take-off and landing at the airport, the jet noise caused by the engine exhaust is a dominant factor. It is known that it is effective to reduce or shield the sound sources as one of the measures.

Japanese Patent No. 6183837 (hereinafter, referred to as Patent Literature 1) and Junichi Akatsuka and Tatsuya Ishii, "Experimental and Numerical Study of Jet Noise Reduction for Supersonic Aircraft Using Variable Folding Nozzle Concept", [online], AIAA paper 2018-3612, AIAA AVIATION Forum 25-29 Jun. 2018, [searched on Jan. 26, 2021], Internet <https://arc.aiaa.org/doi/abs/10.2514/6.2018-3612> (hereinafter, referred to as Non-Patent Literature 2) have proposed low-noise nozzles in which the exit shape of exhaust nozzles is devised as technologies for reducing jet noise during the take-off and landing at the airport. Moreover, a technology of utilizing the aircraft as a shield by devising the arrangement of the engines is known as a technology for shielding fan noise of the engines as disclosed in Japanese Patent Application Laid-open No. 2012-106726 (hereinafter, referred to as Patent Literature 2). On the other hand, regarding jet noise, it is known that since the sound sources are located at the downstream of the exhaust ports of the engines, the shielding effects of the aircraft and the empennage can hardly be obtained. As a technology for improving this jet noise-shielding property, a method of changing the sound source distribution by changing the nozzle's exit shape and shielding noise by providing a rear end plate (aft deck) of the aircraft has been studied as disclosed in James Bridges, "Noise Measurements of a Low-Noise Top-Mounted Propulsion Installation for a supersonic airliner", [online], AIAA paper 2019-0253, AIAA SciTech 2019 Conference 7-11 Jan. 2019, [searched on Jan. 26, 2021], Internet <https://arc.aiaa.org/doi/10.2514/6.2019-0253> (hereinafter, referred to as Non-Patent Literature 1). Also, for example, Japanese Patent Application Laid-open No. 2019-182125 (hereinafter, referred to as Patent Literature 3) and the Japan Aerospace Exploration Agency, "Supplement Ex-Post Evaluation Related to Research and Development of Silent Super Sonic Technology", [online], Jul. 28, 2020, the Ministry of Education, Culture, Sports, Science and Technology, distributed document by the Aviation Technology Committee (66th) [searched on Jan. 26, 2021], Internet <https://www.mext.go.jp/b_menu/shingi/gijyutu/gijyutu2/004/shiryo/1422978_00003.htm> (hereinafter, referred to as Non-Patent Literature 3) have proposed methods using shielding fins arranged at the rear end of the aircraft as the method of reducing sonic booms.

SUMMARY

As to the low-noise nozzles disclosed in Patent Literature 1 and Non-Patent Literature 2, the sound sources of jet noise are located at positions away from the engines, and they are effective in reducing low-frequency components that propagate in the downstream direction. However, they are less effective or can increase noise on the contrary with respect to high-frequency components that propagate on the lateral sides, the sound sources of which are located at positions close to the engines. As to the noise-shielding design of the aircraft disclosed in Patent Literature 2, it is effective with respect to fan noise the sound sources of which are near the engines, though it is not effective with respect to jet noise that is generated by sound sources distributed far from the engines. Therefore, although the method for shielding jet noise has been studied using the method of Non-Patent Literature 1, there is a tradeoff between the jet noise reduction and the sonic boom reduction. On the other hand, the shielding fins that reduce sonic booms disclosed in Patent Literature 3 and Non-Patent Literature 3 do not have the jet noise-shielding effect. Therefore, the technology for reducing jet noise during the take-off and landing at the airport and the technology for reducing sonic booms during the cruise are required separately.

In view of the above-mentioned circumstances, the present technology has been made to accomplish both reduction of sonic booms and reduction of jet noise during the take-off and landing at the airport, which are major challenges in the environmental compatibility of the supersonic aircraft.

According to an embodiment of the present disclosure, there is provided a supersonic aircraft includes:

a shield that shields an engine exhaust flow discharged from a jet engine accommodated in an engine nacelle mounted on a fuselage of the aircraft to thereby reduce sonic booms due to the engine exhaust flow; and an exhaust nozzle that is provided in an exhaust port of the engine nacelle and that generates a sound source for high-frequency components at a position at which the shield is capable of shielding the high-frequency components of the engine exhaust flow, to thereby reduce jet noise having the high-frequency components, and promotes mixing of the engine exhaust flow that generates low-frequency noise components with an external air flow to thereby reduce jet noise having the low-frequency components.

In accordance with this embodiment, by using both the shield that reduces sonic booms and the exhaust nozzle that reduces jet noise having the low-frequency components, the sound source of the high-frequency components is generated at the position at which the shield is capable of shielding the high-frequency components, so that jet noise having the high-frequency components can be reduced. Both the reduction of sonic booms and the airport noise reduction, which are major challenges in the environmental compatibility of the supersonic aircraft, can be accomplished.

The exhaust nozzle promotes mixing of the engine exhaust flow with the external air flow in vicinity of the exhaust port, to thereby generate the sound source of the high-frequency components at the position at which the shield is capable of shielding the high-frequency components of the jet noise.

The exhaust nozzle promotes mixing of the engine exhaust flow with the external air flow at an earlier time (i.e., upstream) due to a disturbance of airstreams in the vicinity of the exhaust port. Therefore, at the upstream, a relatively small-scale disturbance, which is a sound source of the high-frequency components, is strengthened. As a result, the position of the high-frequency sound source can be generated on the upstream side.

In a range of a polar angle in which a nose of the aircraft is at 0 degrees, a direction perpendicular to an exhaust port of the exhaust nozzle is at 90 degrees, and a tail on the aircraft is at 180 degrees, in a range of the polar angle of 110 degrees or more and 140 degrees or less, an amount of jet noise reduction in a case where the exhaust nozzle and the shield are used may be larger than an amount of jet noise reduction in a case where the exhaust nozzle is used and the shield is not used.

In accordance with this embodiment, a high airport noise reduction effect, which cannot be obtained by the combination of the shield and an exhaust nozzle different from the exhaust nozzle according to this embodiment, can be obtained.

In a range of a polar angle in which a nose of the aircraft is at 0 degrees, a direction perpendicular to an exhaust port of the exhaust nozzle is at 90 degrees, and a tail on the aircraft is at 180 degrees, at a polar angle of 140 degrees, an amount of jet noise reduction in a case where the exhaust nozzle and the shield are used may be larger than a sum of an amount of jet noise reduction in a case where the exhaust nozzle is used and the shield is not used and an amount of jet noise reduction in a case where the exhaust nozzle is not used and the shield is used.

In accordance with this embodiment, a higher effect than a simply expected effect from the combination of the shield and the exhaust nozzle different from the exhaust nozzle according to this embodiment can be obtained.

The exhaust nozzle may have a plurality of projecting sections provided in an inner circumference.

With the exhaust nozzle according to this embodiment, by projecting parts inside the exhaust flow path, jet noise during take-off and landing or the like can be inhibited.

The plurality of projecting sections may have an identical shape and an identical size and is provided at equal intervals in a circumferential direction of the exhaust nozzle.

In accordance with this embodiment, the cross-sectional shape of the exhaust flow path can be changed over the whole circumference uniformly.

The number N of the plurality of projecting sections may be N>4.

In a case where the number N of projecting sections is ≤4, since the amount of increase of noise that the exhaust nozzle itself on a lateral side (upstream side) of a rear portion of the aircraft generates is large, the amount of noise increase is still large even by also using the shield. Therefore, even in a case where the exhaust nozzle and the shield are both used, a suitable noise reduction effect cannot be obtained, and it is not practical. In this context, since in a case where N>4, the exhaust nozzle reduces jet noise from the lateral side of the rear portion of the aircraft (upstream side) to the downstream side, a more suitable noise reduction effect can be obtained by also using the shield.

The plurality of projecting sections may each have two sides projecting in an inner circumferential direction of the exhaust nozzle as the exhaust nozzle is viewed axially, and the lengths of the two sides are equal, and provided that the number of the plurality of projecting sections is denoted by N and a length of one side of a regular polygon having an N-number of sides is 1, a length Rf of one side of the projecting section may be Rf>0.5.

Rf≤0.5 means that the amount of projection of the projecting section into the exhaust flow path is small (similar to the circular shape). When the amount of projection of the projecting section into the exhaust flow path is small, a desired acoustic change cannot be obtained. Therefore, Rf≤0.5 does not make a clear difference from the circular exit. In other words, the amount of noise reduction in a case where Rf>0.5 is established is relatively large (i.e., as compared to a case where Rf≤0.5 is established), and therefore it is favorable to set Rf>0.5.

Irrespective of the number N of the plurality of projecting sections and the length Rf of the one side of the projecting section, a cross-sectional area of an exhaust port of the exhaust nozzle is equal.

By setting the cross-sectional area of the exhaust port of the exhaust nozzle to be equal, the values of N and Rf can be suitably selected.

A sound pressure level of high-frequency components of jet noise due to the exhaust nozzle with the plurality of projecting sections may be higher than a sound pressure level of high-frequency components of jet noise due to the exhaust nozzle without the plurality of projecting sections, and a sound pressure level of low-frequency components of jet noise due to the exhaust nozzle with the plurality of projecting sections may be lower than a sound pressure level of low-frequency components of jet noise due to the exhaust nozzle without the plurality of projecting sections.

Depending on the shape of the exhaust nozzle, the effect of reducing jet noise having the low-frequency components is large while jet noise having the high-frequency components increases. However, in this embodiment, the exhaust nozzle is used to generate the sound source of the high-frequency components at the position at which the shield is capable of shielding the high-frequency components of the engine exhaust flow. Accordingly, the shield shields the high-frequency components of the engine exhaust flow, and thus reduces jet noise having the high-frequency components. Therefore, the exhaust nozzle increases jet noise having the high-frequency components, and the shield is nevertheless capable of shielding jet noise having the high-frequency components. Therefore, jet noise can be reduced by using both an exhaust nozzle having a specific shape (i.e., an exhaust nozzle that has a large effect in reducing jet noise having the low-frequency components and increases jet noise having the high-frequency components) and the shield.

The shield suppresses wrapping of the pressure waves generated by the engine exhaust flow downward around the aircraft to thereby reduce sonic booms due to the engine exhaust flow.

In accordance with this embodiment, the shield suppresses wrapping of the pressure waves generated by the engine exhaust flow downward around the aircraft, and sonic booms due to the engine exhaust flow can be reduced.

The shield may include a pair of shields disposed on the aircraft so as to sandwich the engine exhaust flow.

In accordance with this embodiment, the pair of shields suppresses wrapping of the pressure waves generated by the engine exhaust flow downward around the aircraft, and sonic booms due to the engine exhaust flow can be reduced.

The supersonic aircraft may further include a horizontal tail disposed behind the engine nacelle, in which the pair of shields may be disposed on the horizontal tail.

Accordingly, pressure shielding by the shield is effectively performed, and sonic booms can be reduced.

The shield may further include the horizontal tail.

The pressure shielding by the shield is effectively performed through the horizontal tail having a planar shape, and sonic booms can be reduced.

Each of the pair of shields may be inclined outward from the aircraft.

Accordingly, the pressure shielding by the shield is effectively performed, and sonic booms can be reduced.

The supersonic aircraft may further include an aft fuselage lifting surface provided behind the engine nacelle, in which the pair of shields may be disposed on the aft fuselage lifting surface and has a function as a V tail.

Since the supersonic aircraft according to this embodiment also includes the pair of shields, sonic booms can be reduced.

The exhaust nozzle may extend to the rear of an engine and constitutes an exhaust flow path, the exhaust nozzle may have a plurality of main nozzle pieces and at least one coupling nozzle piece, a rear end portion of each of the main nozzle pieces may be provided swingably in an inward and outward direction of the exhaust flow path about an open/close bend section, the open/close bend section being formed at an rear end of a throttle section at the rear of the engine, the coupling nozzle piece may be disposed between adjacent main nozzle pieces and is coupled bendably to the main nozzle pieces on either side thereof, the coupling nozzle piece being coupled bendably to the main nozzle pieces at a side bend section, and the coupling nozzle piece having a central bend section which is capable of forming the plurality of projecting sections inside the exhaust flow path in conjunction with a movement of each of the main nozzle pieces, when the main nozzle pieces are swung outward from the exhaust flow path, the coupling nozzle piece may form a flat surface having no projecting section inside the exhaust flow path, and the cross-sectional area of the exhaust flow path may be wider toward the rear end portion of the exhaust flow path from the position of the open/close bend section, and when the main nozzle pieces are swung inside the exhaust flow path, the coupling nozzle piece may form a projecting section inside the exhaust flow path along the exhaust flow path for narrowing the exhaust flow path.

In accordance with this embodiment, by changing between a first state in which a portion inside the exhaust flow path projects and a notch-shaped projection appears on the inner surface side, and a second state in which no portion inside the exhaust flow path projects and the cross-sectional area of the exhaust flow path becomes wider toward the rear end portion, it is possible to achieve both noise reduction effect during take-off and landing in the first state, and improvement of efficiency during cruising at supersonic speed in the second state. Moreover, it is possible to reduce noise, as well as being able to improve efficiency during cruising at supersonic speed, simply by a change in the cross-sectional shape of the exhaust flow path between the first state and the second state, but without any change, or the like, in the flow path, and without any increase in the complexity and size of the structure of the exhaust nozzle. Furthermore, only the open/close bend sections of the main nozzle pieces need to be actively movable, and the bend sections between the main nozzle pieces and the coupling nozzle pieces bend automatically due to the swinging action of the main nozzle pieces, whereby the cross-sectional shape of the exhaust flow path can be changed, and hence a simple and light-weight mechanism can be achieved, without any increase in the size or complexity of the structure of the exhaust nozzle.

The plurality of main nozzle pieces and the coupling nozzle pieces may constitute the whole circumference of the exhaust flow path to the rear of the engine.

In accordance with this embodiment, since the plurality of main nozzle pieces and the coupling nozzle piece constitutes the whole circumference of the exhaust flow path to the rear of the engine, the cross-sectional shape of the exhaust flow path can be changed over the whole circumference uniformly.

During a supersonic cruise of the supersonic aircraft, the main nozzle piece may be swung outward from the exhaust flow path, and during take-off and landing of the supersonic aircraft, the main nozzle piece may be swung inside the exhaust flow path.

In accordance with this embodiment, when the main nozzle pieces are swung inside the exhaust flow path, the cross-sectional area of the rear end portion of the exhaust flow path is no more than the cross-sectional area at the position of the open/close bend section of the exhaust flow path, whereby it is possible to inhibit noise by means of the notch-shaped projection on the inner surface side created by the coupling nozzle piece when in the first state, while also improving the propulsion efficiency at subsonic speed, such as during take-off and landing, by creating a convergent shape toward the rear end side.

According to an embodiment of the present disclosure, there is provided a method of reducing sonic booms and jet noise, the method including:

shielding, by a shield, an engine exhaust flow discharged from a jet engine accommodated in an engine nacelle mounted on a fuselage of an supersonic aircraft to thereby reduce sonic booms due to the engine exhaust flow; and generating, by an exhaust nozzle that is provided in an exhaust port of the engine nacelle, a sound source for high-frequency components at a position at which the shield is capable of shielding the high-frequency components of the engine exhaust flow, to thereby reduce jet noise having the high-frequency components, and promotes mixing of the engine exhaust flow that generates low-frequency noise components with an external air flow to thereby reduce jet noise having the low-frequency components.

In accordance with the present technology, it is possible to accomplish both reduction of sonic booms of the supersonic aircraft and reduction of jet noise during the take-off and landing at the airport.

It should be noted that the effects described here are not necessarily limited and may be any one of effects described in the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

1. Configuration of Supersonic Aircraft

Figure 1:
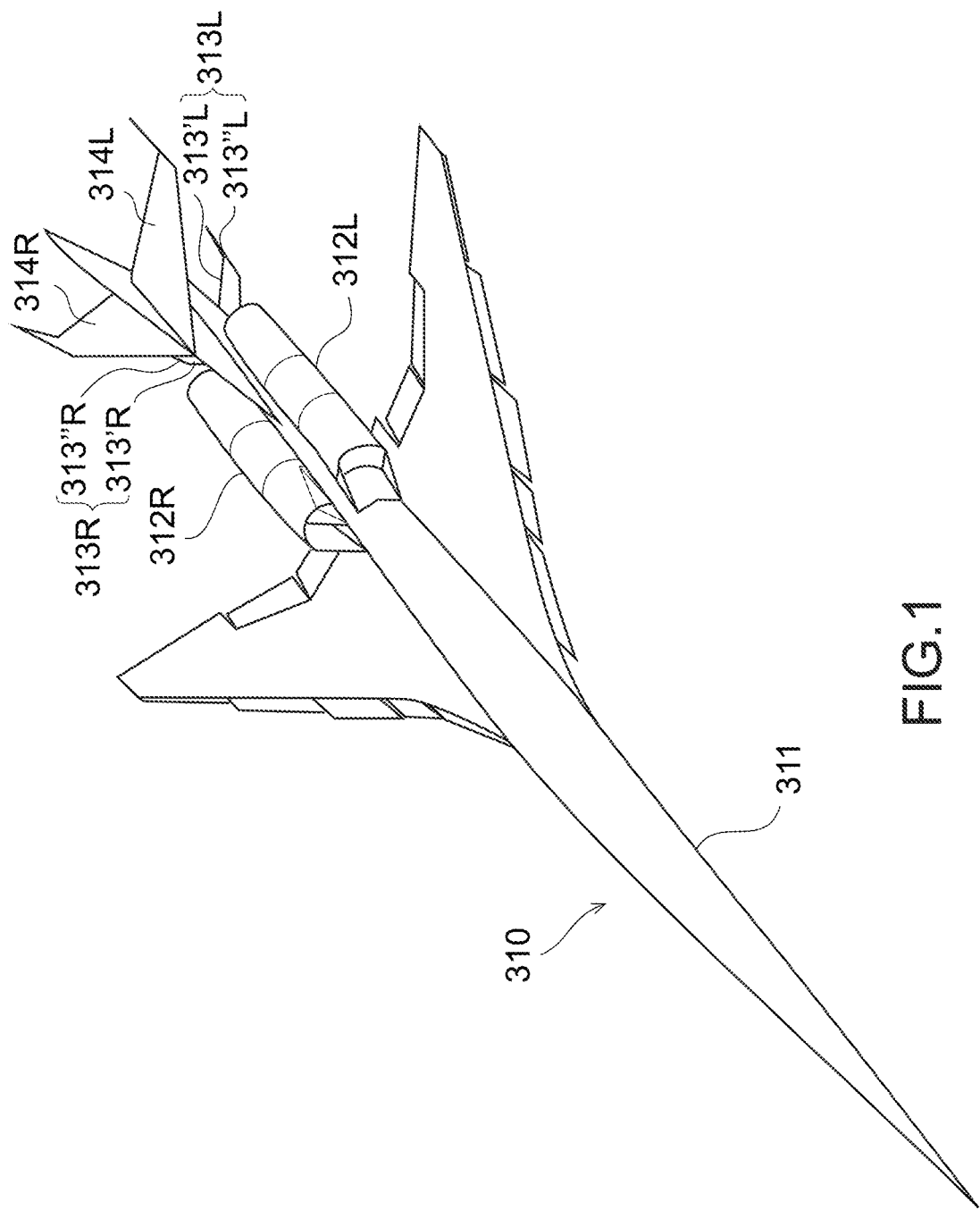
FIG. 1 is a perspective view showing the outer appearance of a supersonic aircraft according to an embodiment of the present technology.

FIG. 1 is a perspective view showing the outer appearance of a supersonic aircraft according to an embodiment of the present technology.

As shown in FIG. 1, the supersonic aircraft according to the embodiment of the present technology includes a pair of engine nacelles 312R, 312L mounted on a fuselage 311 of an aircraft 310, a pair of fins 313R, 313L, and a pair of horizontal tails 314R, 314L disposed behind the engine nacelles 312R, 312L.

The pair of fins 313R, 313L are disposed behind and below the engine nacelles 312R, 312L. The pair of fins 313R, 313L functions as shields. The shields (i.e., the pair of fins 313R, 313L) shield engine exhaust flows discharged from jet engines (not shown) accommodated in the engine nacelles 312R, 312L. This shielding configuration suppresses wrapping of the pressure waves generated by the engine exhaust flows downward around the aircraft 310. Sonic booms are thus reduced.

The right fin 313R includes a horizontal fin 313'R, which has a shape similar to that of the horizontal tail 314R, and an wing tip fin 313"R erected at a right end portion of the horizontal fin 313'R. The wing tip fin 313"R is provided to the horizontal fin 313'R so as to be inclined outward from the aircraft 310 (in the counter-clockwise direction as viewed from the front side in the aircraft axis direction). The left fin 313L includes a horizontal fin 313'L, which has a shape similar to that of the horizontal tail 314L, and an wing tip fin 313"L erected at a left end portion of the horizontal fin 313'L. The wing tip fin 313"L is provided to the horizontal fin 313'L so as to be inclined outward from the aircraft 310

(in the clockwise direction as viewed from the front side in the aircraft axis direction). It should be noted that sonic booms can be reduced by appropriately inclining the wing tip fins 313"R, 313"L.

The pair of horizontal fins 313'R, 313'L is disposed below the engine exhaust flows and the pair of wing tip fins 313"R, 313"L is deposed at positions to sandwich the engine exhaust flows. More specifically, the pair of horizontal fins 313'R, 313'L and the pair of wing tip fins 313"R, 313"L are respectively disposed in plane symmetry with respect to a plane of symmetry that crosses perpendicularly to the axis of the aircraft 310.

Since the supersonic aircraft according to this embodiment includes the fins 313R, 313L, the influence of the engine exhaust flows on sonic booms can be reduced.

Figure 2:
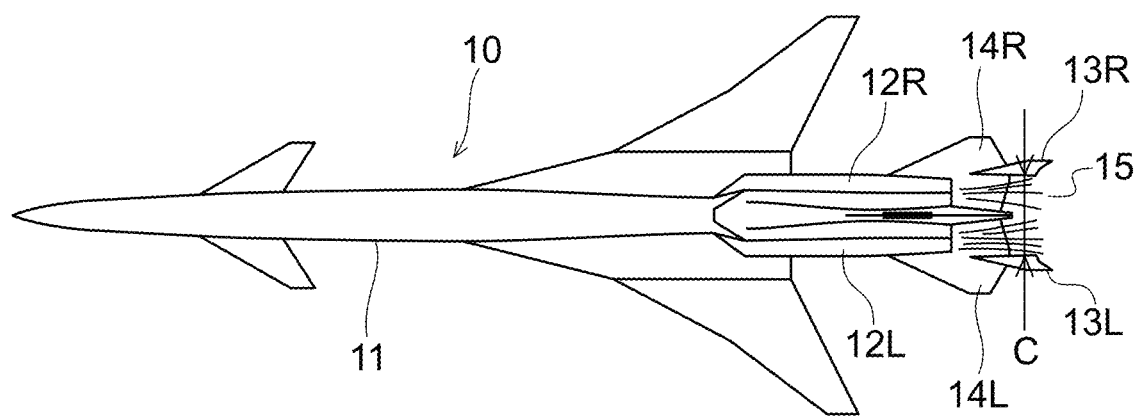
FIG. 2 is a plan view showing the outer appearance of a supersonic aircraft according to another embodiment of the present technology.
Figure 3:
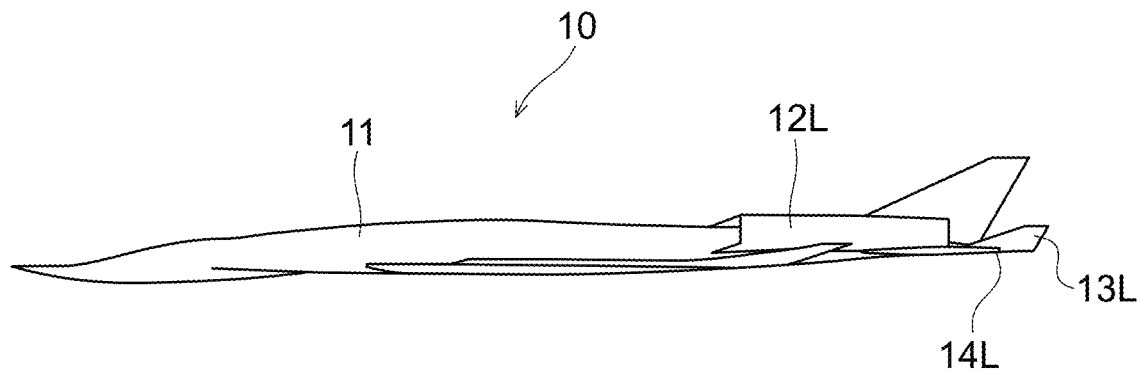
FIG. 3 is a side view showing the outer appearance of the supersonic aircraft shown in FIG. 2.
Figure 4:
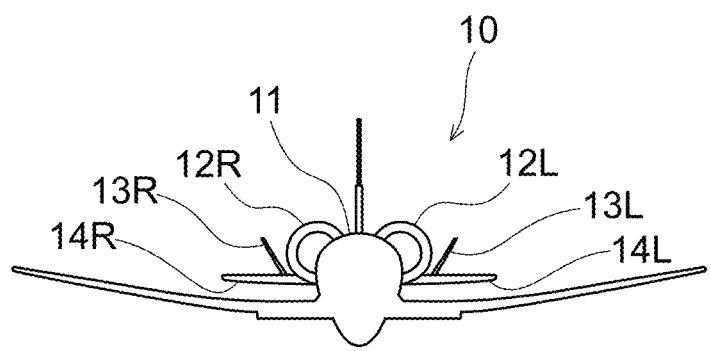
FIG. 4 is a front view showing the outer appearance of the supersonic aircraft shown in FIG. 2.

FIG. 2 is a plan view showing the outer appearance of a supersonic aircraft according to another embodiment of the present technology, FIG. 3 is a side view thereof, and FIG. 4 is a front view thereof.

As shown in FIGS. 2 to 4, the supersonic aircraft according to this embodiment includes a pair of engine nacelles 12R, 12L mounted on a fuselage 11 of an aircraft 10, a pair of fins 13R, 13L, and a pair of horizontal tails 14R, 14L disposed behind the engine nacelles 12R, 12L.

The pair of fins 13R, 13L functions as shields. Alternatively, the pair of fins 13R, 13L and the pair of horizontal tails 14R, 14L function as the shields. In other words, the shields include the pair of fins 13R, 13L and may further include the pair of horizontal tails 14R, 14L. The shields (i.e., the pair of fins 13R, 13L or the pair of fins 13R, 13L and the pair of horizontal tails 14R, 14L) shield engine exhaust flows 15 discharged from jet engines (not shown) accommodated in the engine nacelles 12R, 12L. This shielding configuration suppresses wrapping of the pressure waves generated by the engine exhaust flows 15 downward around the aircraft 10. Sonic booms are thus reduced.

The fins 13R, 13L are typically disposed on the horizontal tails 14R, 14L of the aircraft 10 so as to sandwich the engine exhaust flows 15, respectively. More specifically, the pair of fins 13R, 13L and the pair of horizontal tails 14R, 14L are respectively disposed in plane symmetry with respect to a plane of symmetry that crosses perpendicularly to the axis of the aircraft 10. The fin 13R is mounted on the horizontal tail 14R and the fin 13L is mounted on the horizontal tail 14L.

As shown in FIG. 4, the pair of fins 13R, 13L is each inclined outward from the aircraft 10. By appropriately inclining the fins 13R, 13L in this manner, sonic booms can be reduced.

Since the supersonic aircraft according to this embodiment includes the fins 13R, 13L, the influence of the engine exhaust flows 15 on sonic booms can be reduced.

Figure 5:
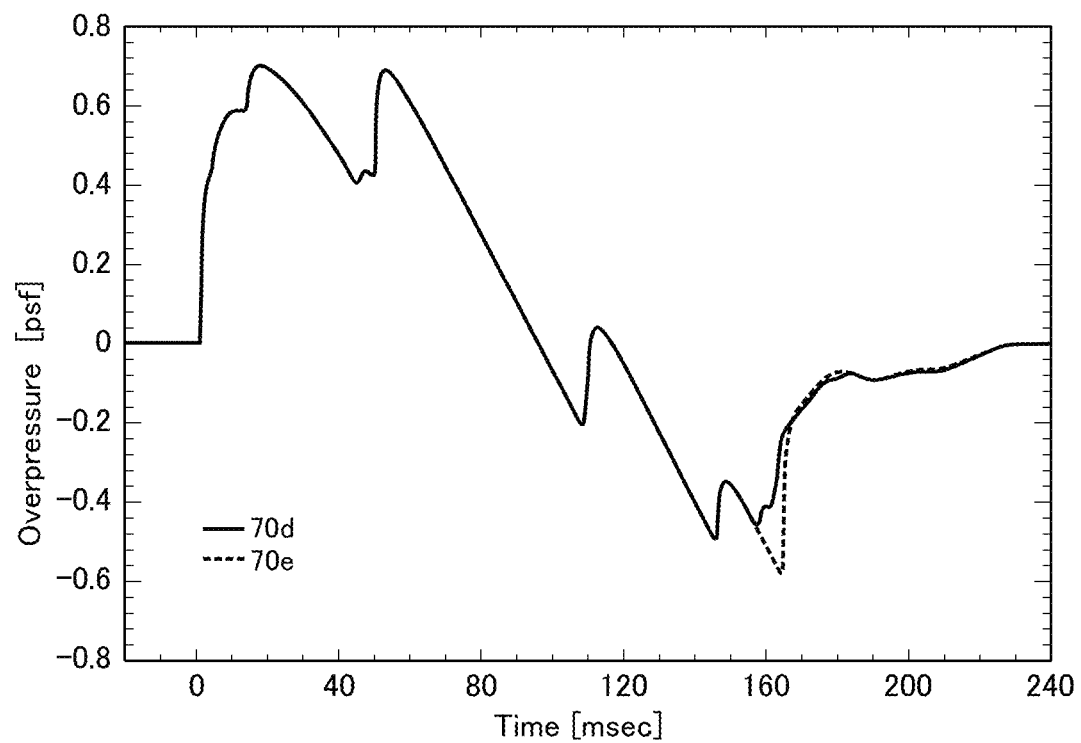
FIG. 5 is a graph showing sonic boom signatures on the ground directly under the aircraft in a case where fins according to the embodiment of the present technology are provided and a case where the fins are not provided for validating the effect of the fins.

FIG. 5 is a graph showing sonic boom signatures on the ground directly under the aircraft in a case where the fins 13R, 13L are provided (70d) and a case where the fins 13R, 13L are not provided (70e).

The following calculation conditions were used:
Altitude: 14.4 km
Mach number: 1.6
Angle of attack: 2.76 degrees
100% thrust.

As it can be seen from FIG. 5, the pressure is higher in the case where the fins 13R, 13L are provided. Therefore, it can be understood that the influence of the engine exhaust 15 on sonic booms is reduced with the fins 13R, 13L.

Figure 6:
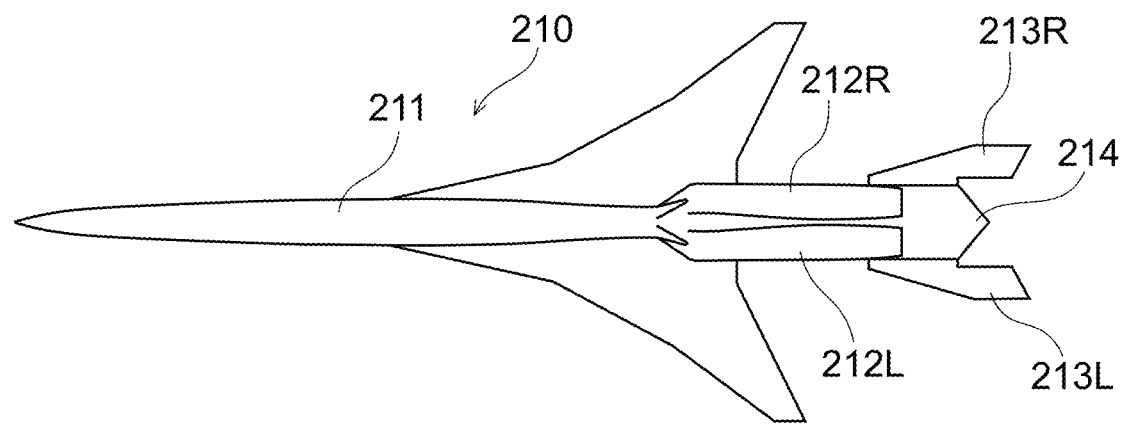
FIG. 6 is a plan view showing the outer appearance of a supersonic aircraft according to another embodiment of the present technology.
Figure 7:
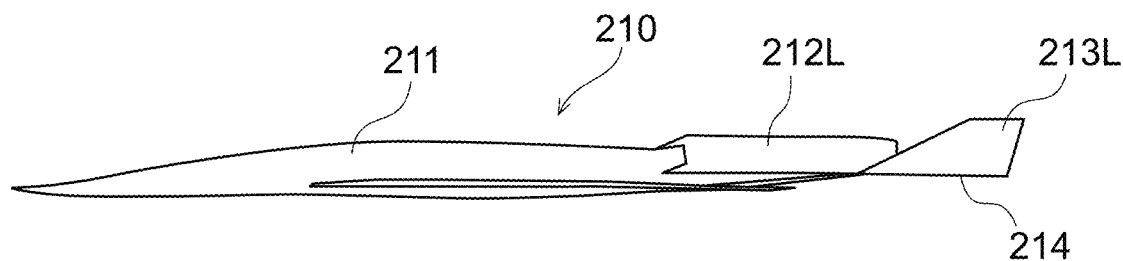
FIG. 7 is a side view showing the outer appearance of the supersonic aircraft shown in FIG. 6.
Figure 8:
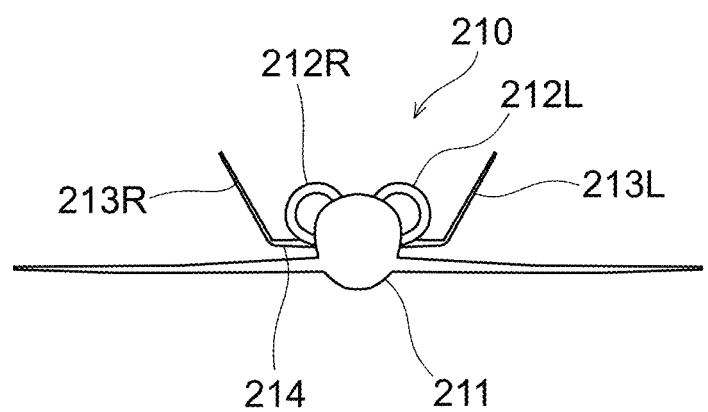
FIG. 8 is a front view showing the outer appearance of the supersonic aircraft shown in FIG. 6.

FIG. 6 is a plan view showing the outer appearance of a supersonic aircraft according to another embodiment of the present technology, FIG. 7 is a side view thereof, and FIG. 8 is a front view thereof.

As shown in FIGS. 6 to 8, the supersonic aircraft according to the other embodiment of the present technology includes a pair of engine nacelles 212R, 212L mounted on a fuselage 211 of an aircraft 210 and a pair of shields 213R, 213L disposed behind the engine nacelles 212R, 212L.

The pair of shields 213R, 213L is mounted on an aft fuselage lifting surface 214 provided behind the engine nacelles 212R, 212L so as to be inclined outward from the aircraft.

The pair of shields 213R, 213L shields engine exhaust flows discharged from jet engines (not shown) accommodated in the engine nacelles 212R, 212L. This shielding configuration suppresses wrapping of the pressure waves generated by the engine exhaust flows downward around the fuselage 211. Sonic booms are thus reduced. Moreover, the pair of shields 213R, 213L has a function as a V tail.

Since the supersonic aircraft according to this embodiment also includes the pair of shields 213R, 213L, sonic booms can be reduced.

2. Concept of this Embodiment

Figure 9:
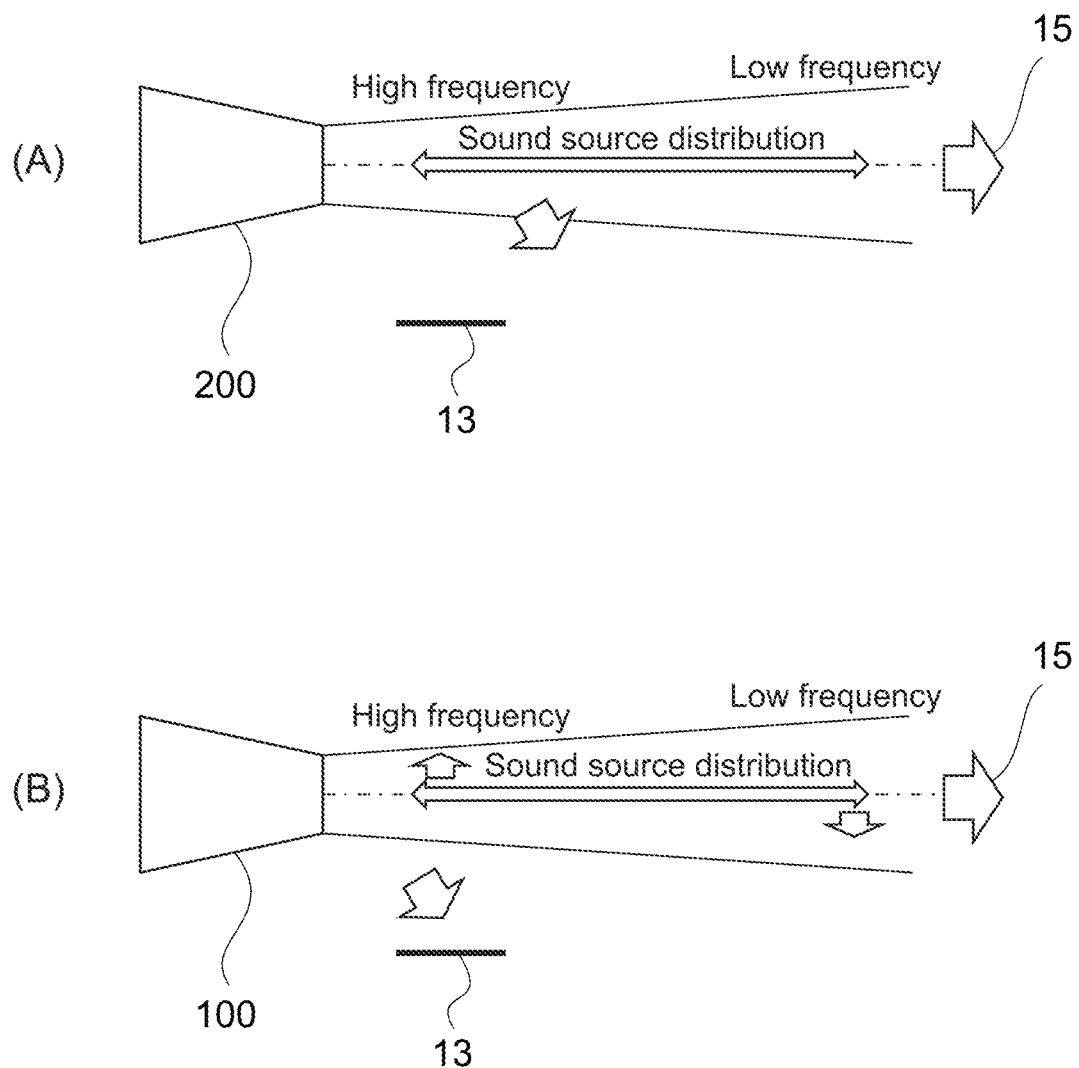
FIG. 9 is diagrams for describing the concept of this embodiment.

FIG. 9 is diagrams for describing the concept of this embodiment.

The shield (shield 13 in FIG. 9) of each of the above-mentioned embodiment reduces sonic booms during the supersonic cruise as described above. However, the shield 13 has a small effect in reducing jet noise during the take-off and landing at the airport. The principle will be described with reference to (A) of FIG. 9.

(A) of FIG. 9 schematically shows a comparative example. (A) of FIG. 9 schematically shows the shield 13 on the airframe of the supersonic aircraft, an exhaust nozzle 200 provided in an exhaust port of one engine nacelle, and engine exhaust flows 15 discharged from the exhaust nozzle 200. The exhaust nozzle 200 according to the comparative example is not a nozzle designed to reduce noise, but a nozzle having a circular exit with no projecting sections.

Sound sources of jet noise generated by the engine exhaust flows 15 discharged from the exhaust nozzle 200 are dispersed at positions away from the rear portion of the aircraft. On the other hand, the shield 13 is typically a fin mounted on the horizontal tail. In a position relationship in which the shield 13 is provided on the horizontal tail and the sound sources of jet noise are located at the positions away from the rear portion of the aircraft (i.e., behind the horizontal tail), the shield 13 cannot shield the greater part of the jet noise.

Regarding the sound source distribution of the jet noise generated by the engine exhaust flows 15, sound sources for high-frequency components exist on the upstream side of the engine exhaust flows 15 (i.e., a side closer to the rear portion of the aircraft) and sound sources for low-frequency components exist on the downstream side. The shield 13 cannot shield the low-frequency components and shield only part of the high-frequency components close to the aircraft. Its contribution is small with respect to the entire jet noise, and does not provide a significant noise reduction effect.

As described above, the shield 13 provided on the horizontal tail cannot reduce jet noise during the take-off and landing at the airport.

In this context, in this embodiment, the shield 13 is provided on the airframe of the supersonic aircraft to thereby reduce sonic booms during the supersonic cruise. At the same time, the shield 13 is further utilized to reduce jet noise during the take-off and landing at the airport. In view of this, in this embodiment, an exhaust nozzle 100 designed to reduce noise is used as shown in (B) of FIG. 9. The exhaust nozzle 100 is a low-noise nozzle that promotes mixing, such as a Chevron nozzle and a petal-shaped folding-type nozzle. In this embodiment, the petal-shaped folding-type nozzle is employed as the exhaust nozzle 100.

(B) of FIG. 9 schematically shows this embodiment. (B) of FIG. 9 schematically shows the shield 13 provided on the airframe of the supersonic aircraft, the exhaust nozzle 100 provided in the exhaust port of the engine nacelle, and engine exhaust flows 15 discharged from the exhaust nozzle 100.

The exhaust nozzle 100 that promotes mixing, such as the petal-shaped folding-type nozzle, is effective in reducing jet noise having the low-frequency components, the sound source of which is located at the position on the downstream side away from the rear portion of the aircraft and which propagates in the downstream direction. Specifically, the exhaust nozzle 100 promotes mixing of the low-frequency components of the engine exhaust flows 15, which are located at the position on the downstream side away from the rear portion of the aircraft, with an external air flow, to thereby reduce jet noise having the low-frequency components (the image is shown as the downward arrow).

On the other hand, the exhaust nozzle 100 that promotes mixing, such as the petal-shaped folding-type nozzle, has a small effect in reducing the noise having the high-frequency components and the noise having the high-frequency components can increase in some designs (the image is shown as the upward arrow). In view of this, in this embodiment, the shield 13 that reduces sonic booms during the supersonic cruise is utilized to reduce jet noise having the high-frequency components. In other words, jet noise having the low-frequency components is reduced due to the mixing promotion of the exhaust nozzle 100 while jet noise of low-frequency components is reduced by utilizing the shield 13. That is the concept of this embodiment.

Since the shield 13 aims at reducing sonic booms, the position of the shield 13 is determined in advance as a position effective in reducing sonic booms. Typically, the position of the shield 13 is the horizontal tail position. In view of this, in this embodiment, the exhaust nozzle 100 is used to generate a sound source of the high-frequency components at a position at which the shield 13 located at this predetermined position is capable of shielding the high-frequency components of the engine exhaust flows 15.

Figure 24:
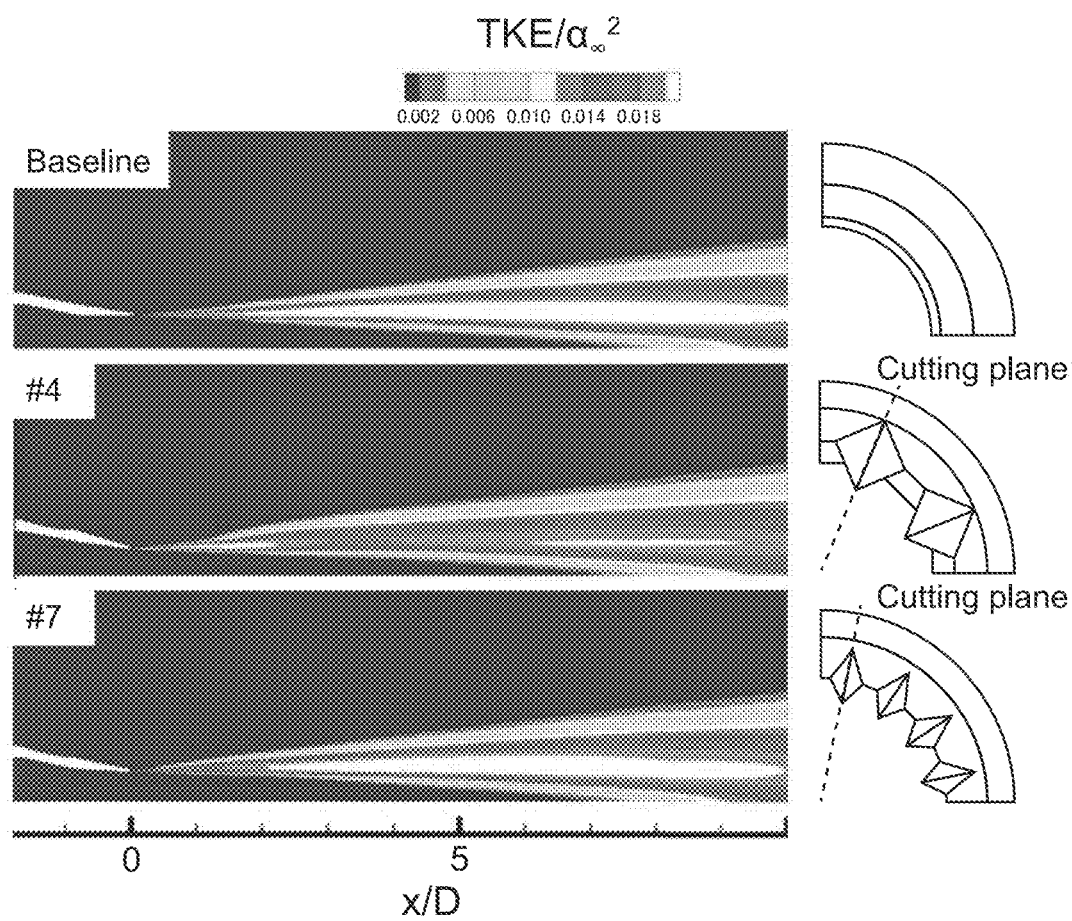
FIG. 24 is contour diagrams of turbulent kinetic energy (TKE) in an exhaust flow direction when the different exhaust nozzles were used.
Figure 25:
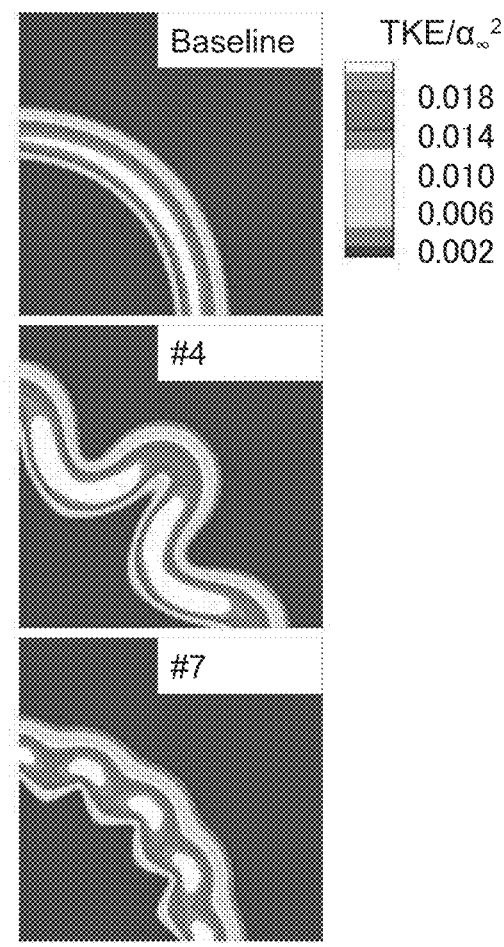
FIG. 25 is contour diagrams of the TKE in the vicinity of an exhaust port of the exhaust nozzle when the different exhaust nozzles were used.

FIG. 24 is contour diagrams of turbulent kinetic energy (TKE) in an exhaust flow direction in a case where different exhaust nozzles were used. FIG. 25 is contour diagrams of the TKE in the vicinity of the exhaust port of the exhaust nozzle in a case where the different exhaust nozzles were used.

The exhaust nozzle 100 that promotes mixing, such as the petal-shaped folding-type nozzle, can increase the noise having the high-frequency components while it can also move the sound source of the high-frequency components. As shown in FIGS. 24 and 25, the TKE in the vicinity of the exhaust port (x/D=0) in petal-shaped exhaust nozzles #4 and #7 (their configurations will be described later in detail), especially, the exhaust nozzle #4 is greater than the TKE in the vicinity of the circular exhaust port of the exhaust nozzle (Baseline). It means that the petal-shaped exhaust nozzles #4 and #7, especially, the exhaust nozzle #4 moves the sound source of the high-frequency components closer to the exhaust port (further upstream). The reason why such a phenomenon occurs will be described.

The exhaust nozzle 100 that promotes mixing, such as the petal-shaped folding-type nozzle, has a projecting section that projects into the exhaust flow path near the exhaust port. As the amount of projection of the projecting section into the exhaust flow path increases, the disturbance (TKE) of the airstreams in the vicinity of the projecting section (i.e., in the vicinity of the exhaust port) increases. The disturbance (TKE) of the airstreams in the vicinity of the projecting section (i.e., in the vicinity of the exhaust port) promotes mixing of the engine exhaust flow with the external air flow at an earlier time (i.e., upstream). Therefore, at the downstream, a relatively large-scale disturbance, which is a sound source of the low-frequency components, is weakened. On the other hand, at the upstream, a relatively small-scale disturbance, which is a sound source of the high-frequency components, is strengthened. As a result, the position of the high-frequency sound source appears on the upstream side.

In this embodiment, such an exhaust nozzle 100 is used to move the position of the sound source of the high-frequency components from the position (see (A) of FIG. 9) where the shield 13 is incapable of shielding to the position (see (B) of FIG. 9) where the shield 13 is capable of shielding. Specifically, the sound source of the high-frequency components is moved from the position (see (A) of FIG. 9) further from the rear portion of the aircraft to the position (see (B) of FIG. 9) closer to the rear portion of the aircraft. Accordingly, the shield 13 can shield the high-frequency components of the engine exhaust flows 15, and jet noise having the high-frequency components can be thus reduced.

Figure 26:
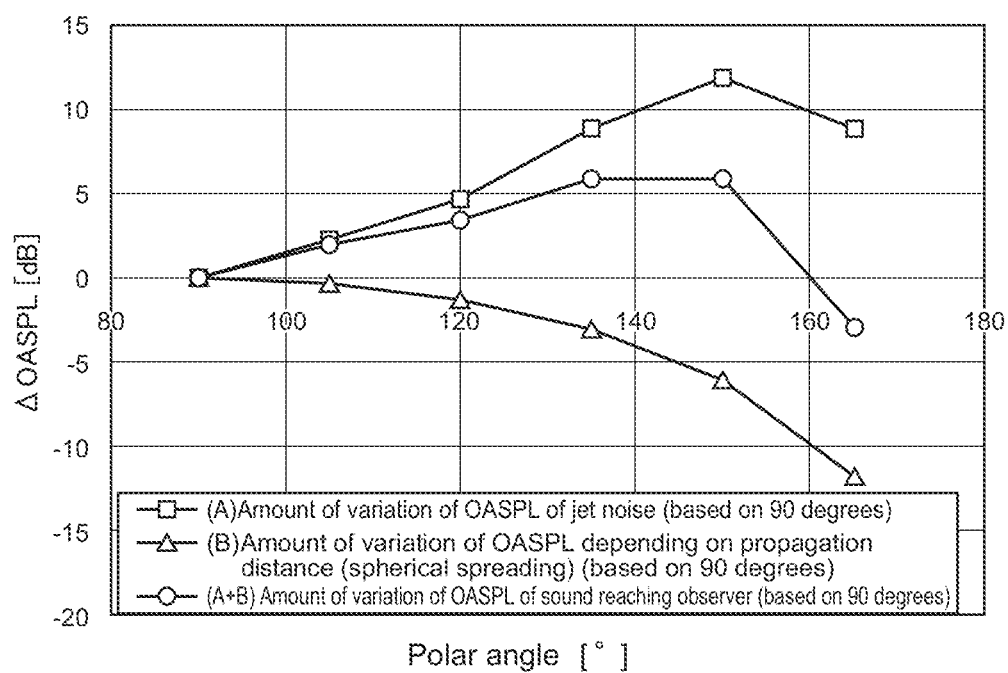
FIG. 26 shows the amount of variation of the sound pressure level with respect to different polar angles, using the sound pressure level at the polar angle of 90 degrees as the base.

FIG. 26 shows the amount of variation ΔOASPL of the sound pressure level (OASPL) with respect to different polar angles, using the sound pressure level at the polar angle of 90 degrees as the base. Specifically, FIG. 26 shows (A) the amount of variation of the sound pressure level (OASPL) of jet noise, (B) the amount of variation of the sound pressure level (OASPL) depending on the propagation distance (spherical spreading), and (A+B) the amount of variation of the sound pressure level (OASPL) of the sound that reaches an observer. The vertical axis indicates that as the value on a negative side (i.e., a side smaller than zero) is larger, noise with respect to the sound pressure level at the polar angle of 90 degrees is lower. In contrast, as the value on a positive side (i.e., a side larger than zero) is larger, noise with respect to sound pressure level at the polar angle of 90 degrees is higher.

The polar angle is an angle range in which the nose of the aircraft is at 0 degrees, the direction perpendicular to the exhaust port of the exhaust nozzle is at 90 degrees, and the tail on the aircraft is at 180 degrees. As shown in FIG. 26, in a case of reducing jet noise of the aircraft that flies horizontally above the head, the influence of the polar angle is not uniform. Jet noise of commercial supersonic aircraft expected to go into service in the future has a distribution taking a maximum value at the polar angle of approximately 140 to 160 degrees. Moreover, noise decreases inversely proportional to the square of the propagation distance due to spherical spreading, and noise is greatly attenuated in the downstream direction (e.g., 160 degrees), in which the distance to the observer increases, during the propagation. Therefore, noise that the observer can feel becomes maximum at the polar angle of approximately 140 to 150 degrees (see FIG. 26). In this embodiment, the noise reduction effect especially at the polar angle of about 140 degrees can be improved by using both the exhaust nozzle 100 and the shield 13.

3. Configuration of Exhaust Nozzle

Figure 10:
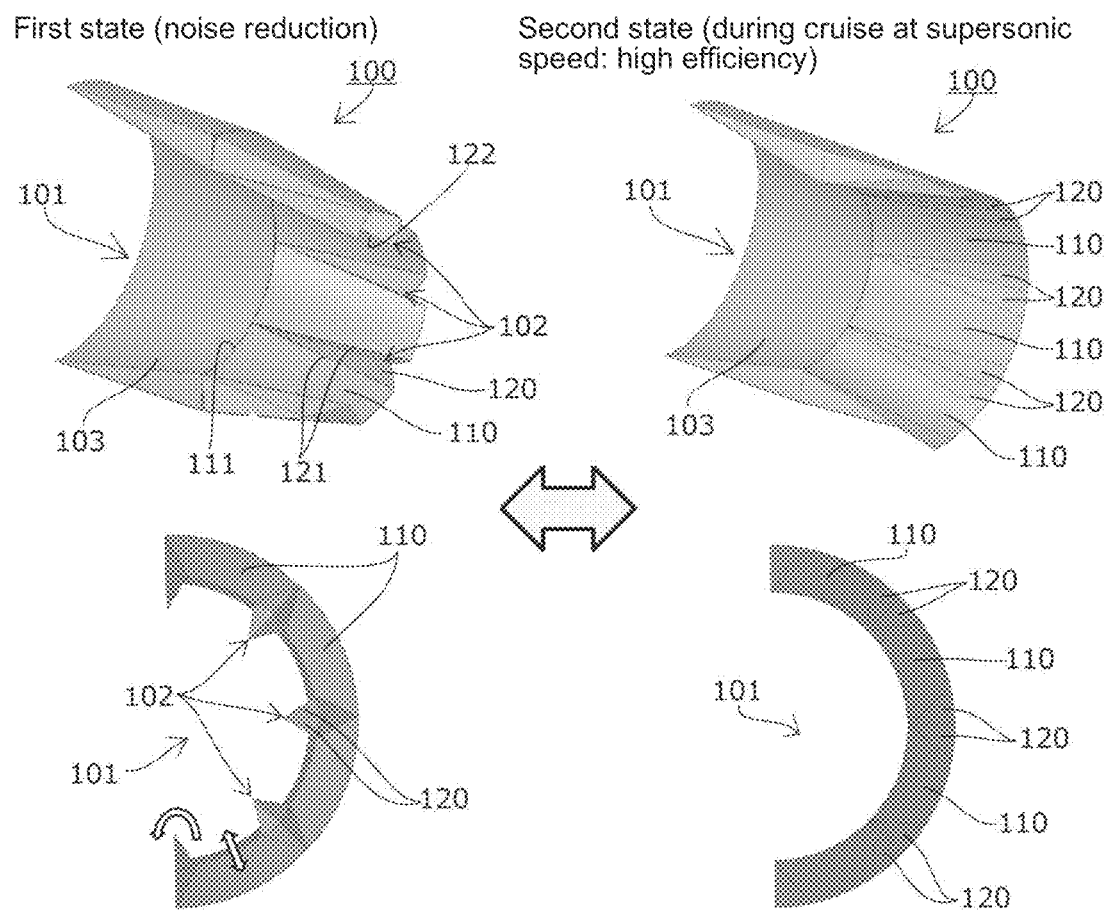
FIG. 10 is an explanatory diagram of variations of a cross-sectional shape of an exhaust flow path according to an embodiment of the present technology.
Figure 11:
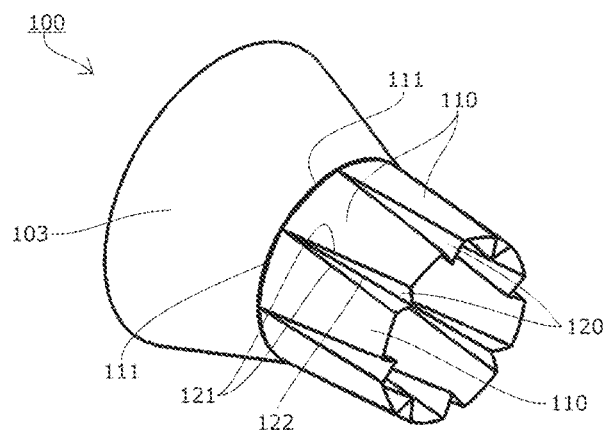
FIG. 11 is a schematic perspective view in a first state of the exhaust nozzle according to the embodiment of the present technology.
Figure 12:
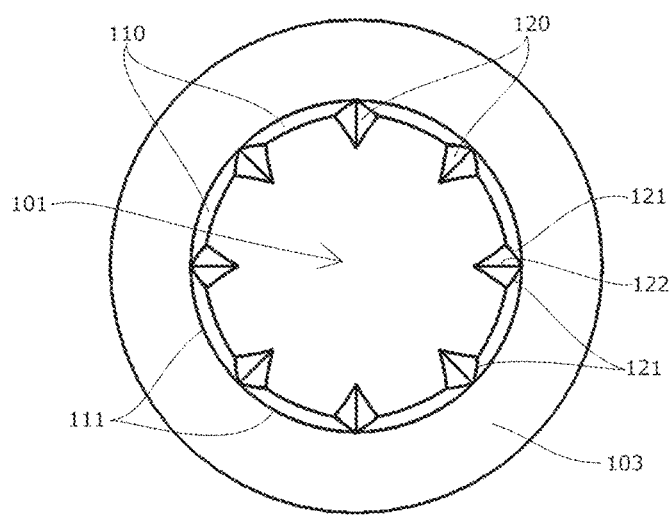
FIG. 12 is a front view as viewed from the exhaust side of FIG. 11.
Figure 13:
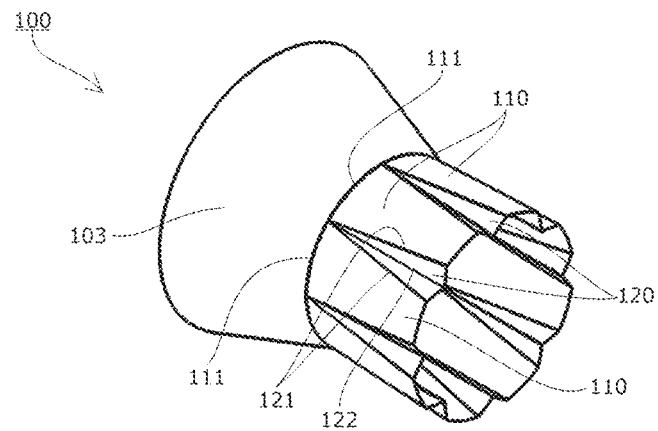
FIG. 13 is a schematic perspective view of an intermediate state between the first state and a second state of the exhaust nozzle according to the embodiment of the present technology.
Figure 14:
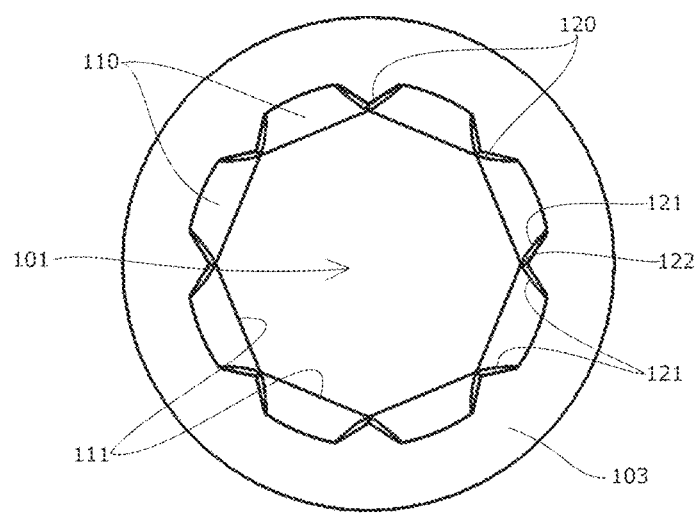
FIG. 14 is a front view as viewed from the exhaust side of FIG. 13.
Figure 15:
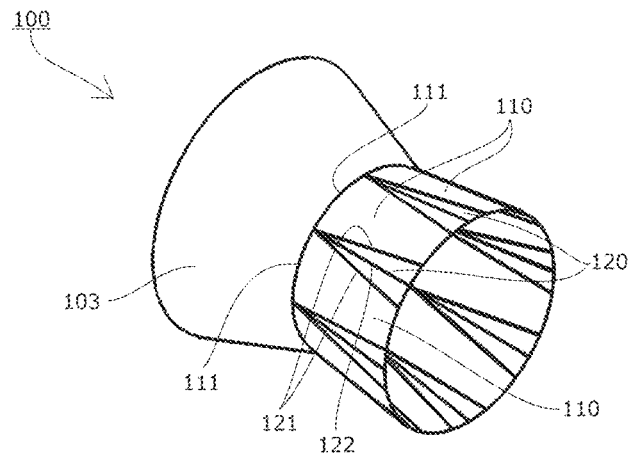
FIG. 15 is a schematic perspective view in a second state of the exhaust nozzle according to the embodiment of the present technology.
Figure 16:
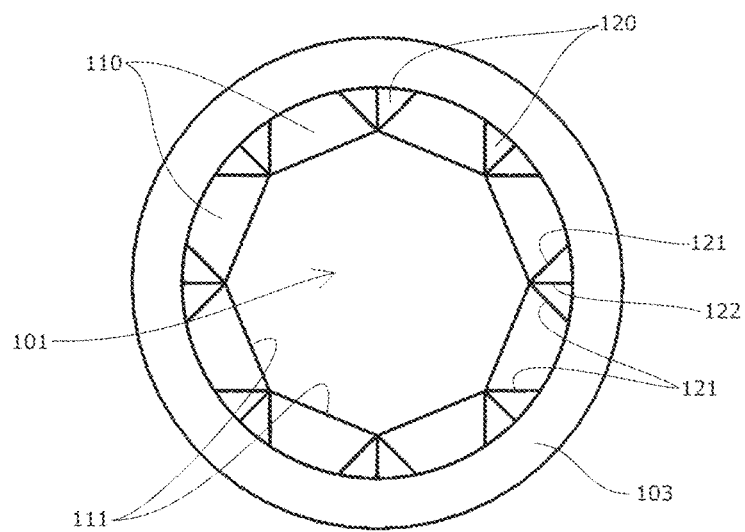
FIG. 16 is a front view as viewed from the exhaust side of FIG. 15.

FIG. 10 is an explanatory diagram of variations in the cross-sectional shape of the exhaust flow path according to an embodiment of the present technology. FIG. 11 is a schematic perspective view in a first state of the exhaust nozzle according to the embodiment of the present technology. FIG. 12 is a front view from the exhaust side of FIG. 11. FIG. 13 is a schematic perspective view of an intermediate state between the first state and a second state of the exhaust nozzle according to the embodiment of the present technology. FIG. 14 is a front view from the exhaust side of FIG. 13. FIG. 15 is a schematic perspective view in the second state of the exhaust nozzle according to the embodiment of the present technology. FIG. 16 is a front view from the exhaust side of FIG. 15.

The exhaust nozzles 100 are provided in the exhaust ports of the engine nacelles 312R, 312L, 12R, 12L, 212R, 212L of each of the above-mentioned embodiments, respectively. The exhaust nozzle 100 according to the embodiment of the present technology is a folding-type exhaust nozzle the shape of which is variable between the first state of the petal shape and the second state of the circular shape, and is a low-noise nozzle that promotes mixing. Hereinafter, a representative example of the configuration of the exhaust nozzle 100 will be described.

As shown in FIGS. 10 to 16, the exhaust nozzle 100 according to the embodiment of the present technology includes a plurality of main nozzle pieces 110, which is provided so that the rear end portion can be swung in an inward and outward direction of an exhaust flow path 101 about an open/close bend section 111 at the rear of the jet engine, and a plurality of coupling nozzle pieces 120 each disposed between adjacent ones of the main nozzle pieces 110. The plurality of main nozzle pieces 110 and the coupling nozzle pieces 120 constitute the whole circumference of the exhaust flow path 101 at the rear of the jet engine.

The main nozzle pieces 110 are configured to be swingable by an actuator (not shown) about the open/close bend section 111 at the rear end of a throttle section 103. Due to the swinging of the main nozzle pieces 110, the exhaust nozzle 100 changes between the first state of the petal shape in which the cross-sectional area at the rear end portion of the exhaust flow path 101 shown on the left side of FIG. 10 is the narrowest and the second state of the circular shape in which the cross-sectional area at the rear end portion of the exhaust flow path 101 shown in on the right side of FIG. 10 is the widest. In the first state of the petal shape, the coupling nozzle pieces 120 are bent and project inside the exhaust flow path 101. In the second state of the circular shape, the coupling nozzle pieces 120 do not project inside the exhaust flow path 101 and the cross-sectional area of the exhaust flow path 101 has a shape wider toward the rear end portion.

The exhaust nozzle 100 according to the embodiment of the present technology will be described on the basis of FIGS. 11 and 12 showing the first state of the petal shape, FIGS. 13 and 14 showing an intermediate state between the first state of the petal shape and the second state of the circular shape, and FIGS. 15 and 16 showing the second state of the circular shape.

It should be noted that FIGS. 11 to 16 omit the shapes in the thickness direction of the main nozzle pieces 110 and the coupling nozzle pieces 120, and show them as uniform thin plates that define only the inner surface side of the exhaust flow path 101.

In this embodiment, the throttle section 103 is formed in a truncated cone shape in which the cross-sectional area at the rear end is the smallest. Using the rear end of the throttle section 103 as the open/close bend section 111, eight main nozzle pieces 110 are provided over the whole circumference. The open/close bend section 111 is configured by hinge connection of the throttle section 103 and the main nozzle pieces 110.

The main nozzle pieces 110 are formed such that the width in the circumferential direction decreases from the open/close bend section 111 toward the rear end. Each of the coupling nozzle pieces bendable inside the exhaust flow path is provided between adjacent ones of the main nozzle pieces 110.

The coupling nozzle piece 120 has the main nozzle pieces 110 on both sides and a central bend section 122 that is bendably connected by side bend sections 121 and forms a projecting section at the center.

In this embodiment, the coupling nozzle piece 120 is configured by two members hinged at the central bend section 122 and is configured by also hinging the side bend sections 121.

In the first state of the petal shape in which the main nozzle pieces 110 are located at positions where the main nozzle pieces 110 are swung inside the exhaust flow path 101 at the maximum and the cross-sectional area at the rear end portion of the exhaust flow path 101 is the narrowest, as shown in FIGS. 11 and 12, the rear end portions of the main nozzle pieces 110 are positioned slightly inside the exhaust flow path 101 with respect to the open/close bend sections 111 and the coupling nozzle pieces 120 are held in a state in which, as viewed from the outer circumference of the exhaust nozzle 100, the side bend sections 121 are in a large mountain fold state and the central bend sections 122 in a large valley fold state. Then, parts of the central bend sections 122 form projecting sections 102 projecting inside the exhaust flow path 101.

When the main nozzle pieces 110 are swung outside the exhaust flow path 101 by the actuator (not shown) from the above-mentioned state, as shown in FIGS. 13 and 14, along with the movement in which the rear end portions of the main nozzle pieces 110 expand outwards, the mountain fold state of the side bend sections 121 and the valley fold state of the central bend sections 122 of the coupling nozzle pieces 120 gradually become smaller. Then, the projecting sections 102 in which the parts of the central bend sections 122 project inside the exhaust flow path 101 also become smaller.

In the second state of the circular shape in which the main nozzle pieces 110 are located at positions where the main nozzle pieces 110 are swung outside the exhaust flow path 101 at the maximum and the cross-sectional area at the rear end portion of the exhaust flow path 101 is the widest, as shown in FIGS. 15 and 16, the central bend sections 122 of the coupling nozzle pieces 120 are not bent anymore and the projecting sections 102 do not project inside the exhaust flow path 101. Moreover, behind the open/close bend section 111, the rear end portions of the main nozzle pieces 110 and the coupling nozzle pieces 120 form a shape similar to the truncated cone shape in which the cross-sectional area at the rear end is the largest.

When the main nozzle pieces 110 are swung inside the exhaust flow path 101 by the actuator (not shown) from the above-mentioned state, the first state of the petal shape shown in FIGS. 11 and 12 is obtained after the state shown in FIGS. 13 and 14 described above.

It should be noted that it is sufficient that the shape and thickness on the outer circumference side of the throttle section 103, the main nozzle pieces 110, and the coupling nozzle pieces 120 is designed as appropriate in consideration of aerodynamic characteristics and the like during the flight.

Moreover, by designing the shape on the outer circumference side of the coupling nozzle pieces 120 to be a triangular pyramid shape as shown in FIG. 10, it becomes possible to define the bending limits of the central bend sections 122 and the side bend sections 121, and the first state of the petal shape and the second state of the circular shape can be reliably secured.

The cross-sectional area of the exhaust flow path 101 that changes with the above-mentioned exhaust nozzle 100 will be described. In the first state of the petal shape, the portion behind the position of the open/close bend section 111 has a cross-sectional area in which it is convergent, which is suitable for the take-off and landing or the like. In the second state of the circular shape, the portion behind the position of the open/close bend section 111 has a cross-sectional area in which it is convergent-divergent, which is suitable for the supersonic cruise. Moreover, as shown in FIGS. 10 to 12, in the first state of the petal shape, since the coupling nozzle pieces 120 are bent inside the exhaust flow path 101 and form the projecting sections 102, the exhaust flow shape is curved in a notch-shape. The Mach number distribution of the exhaust jet is a notch-shaped distribution. Accordingly, it is possible to promote mixing of the exhaust flow with the external air flow and to reduce jet noise during the take-off and landing at the airport.

The exhaust nozzle 100 reduces jet noise having the low-frequency components especially by promoting mixing of the low-frequency components of the engine exhaust flow with the external air flow.

4. Shape Variations of Projecting Sections of Exhaust Nozzle

Figure 17:
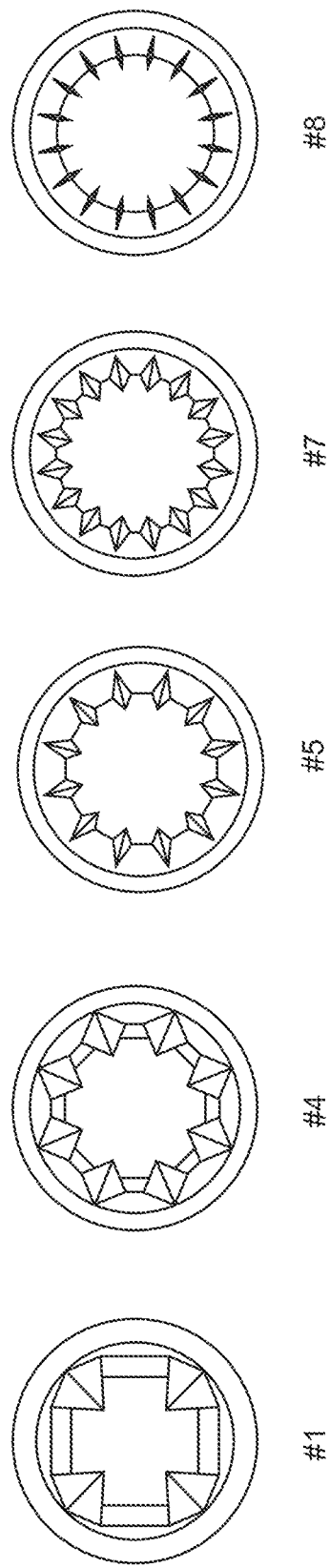
FIG. 17 shows variations of projecting sections shape of the exhaust nozzle.

FIG. 17 shows shape variations of the projecting sections of the exhaust nozzle.

Shape variations of the projecting sections 102 when the exhaust nozzle 100 is in the first state of the petal shape (corresponding to FIG. 12) will be described. The exhaust nozzle 100 has a plurality of (i.e., N-number of) projecting sections 102 provided in the inner circumference of the exhaust nozzle 100. The plurality of projecting sections 102 has the identical shape and the identical size and is provided at equal intervals in the circumferential direction of the exhaust nozzle 100. The plurality of projecting sections 102 each has two sides projecting in the inner circumferential direction of the exhaust nozzle 100 as the exhaust nozzle 100 is viewed in the axial direction and lengths Rf, Rf of the two sides are equal. Provided that the length of one side of a regular polygon having the N-number of sides that constitute the exhaust port of the exhaust nozzle 100 is 1, the length Rf of one side of the N-number of the projecting sections 102 means the length of the side folded inside the exhaust port with respect to the one side of the regular polygon having the N-number of sides.

Irrespective of the number N of the plurality of projecting sections 102 and the length Rf of the one side of the projecting section, the area of the exhaust port of the exhaust nozzle 100 is equal. In other words, the cross-sectional areas of the exits of exhaust ports of five types of exhaust nozzles #1, #4, #5, #7, #8 are all equal.

The exhaust nozzle #1 has an N=4-number of projecting sections. Provided that the length of the one side of a square constituted by the exhaust port of the exhaust nozzle #1 is 1, the length Rf of the one side of the projecting section equals 0.59. In other words, the length Rf of the one side of the projecting section is 59% with respect to the length of the one side of the square constituted by the exhaust port of the exhaust nozzle #1.

The exhaust nozzle #4 has an N=8-number projecting sections as in FIG. 12. Provided that the length of one side of a regular octagon constituted by the exhaust port of the exhaust nozzle #4 is 1, the length Rf of the one side of the projecting section equals 0.75. In other words, the length Rf of the one side of the projecting section is 75% with respect to the length of the one side of the regular octagon constituted by the exhaust port of the exhaust nozzle #4.

The exhaust nozzle #5 has an N=12-number projecting sections. Provided that the length of one side of a regular dodecagon constituted by the exhaust port of the exhaust nozzle #5 is 1, the length Rf of the one side of the projecting section equals 0.62. In other words, the length Rf of the one side of the projecting section is 62% with respect to the length of the one side of the regular dodecagon constituted by the exhaust port of the exhaust nozzle #5.

The exhaust nozzle #7 has an N=16-number of projecting sections. Provided that the length of one side of a hexadecagon constituted by the exhaust port of the exhaust nozzle #7 is 1, the length Rf of the one side of the projecting section equals 0.77. In other words, the length Rf of the one side of the projecting section is 77% with respect to the length of the one side of the hexadecagon constituted by the exhaust port of the exhaust nozzle #7.

The exhaust nozzle #8 has an N=16-number of projecting sections. Provided that the length of one side of the hexadecagon constituted by the exhaust port of the exhaust nozzle #8 is 1, the length Rf of the one side of the projecting section equals 0.42. In other words, the length Rf of the one side of the projecting section is 42% with respect to the length of the one side of the hexadecagon constituted by the exhaust port of the exhaust nozzle #8.

5. Jet Noise Reduction Effect of Exhaust Nozzle in Case Where Shield is Not Provided FIG. 18 shows distributions of the sound pressure levels of the plurality of exhaust nozzles of different types with respect to the dimensionless frequency.

Figure 18:
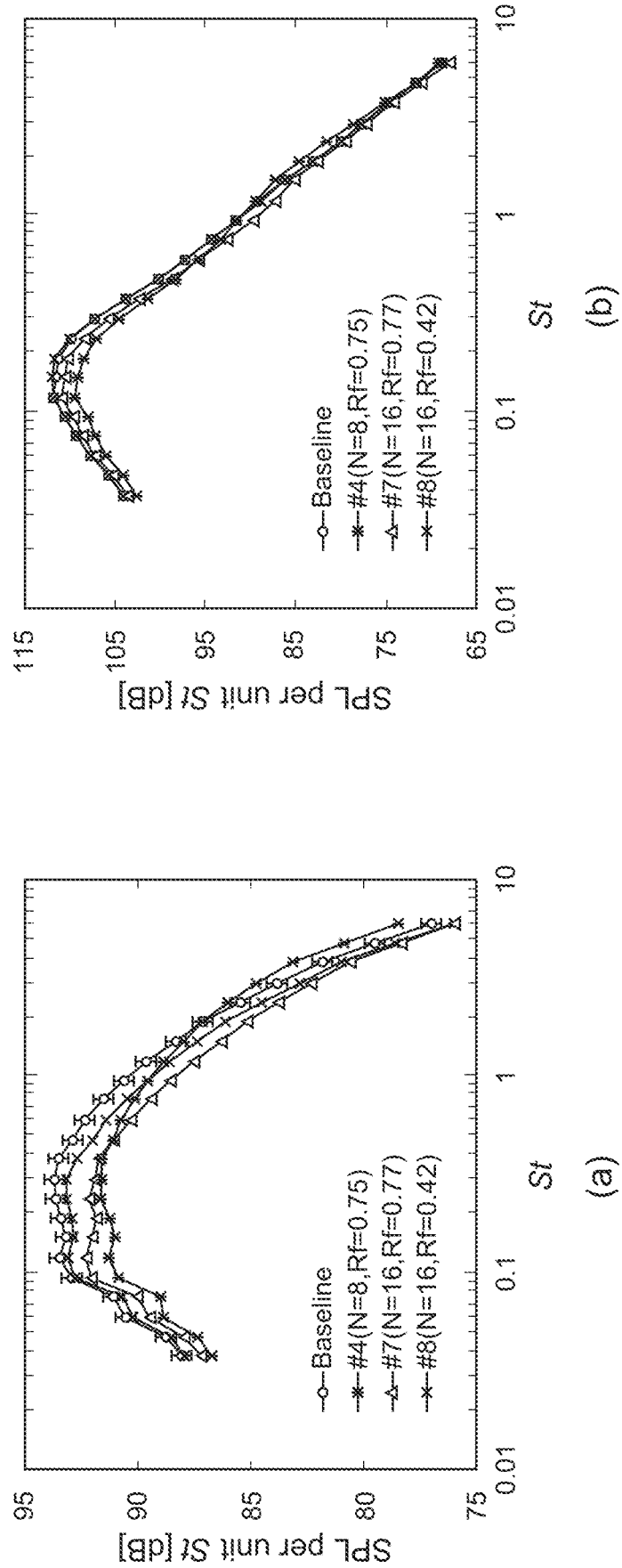
FIG. 18 shows distributions of sound pressure levels of a plurality of exhaust nozzles of different types with respect to the dimensionless frequency.

FIG. 18 shows distributions of the sound pressure levels (SPL) of the three types of exhaust nozzles #4, #7, #8 with respect to the dimensionless frequency St and an exhaust nozzle (reference value: Baseline) with no projecting sections in a case where the shield 13 is not provided. (a) shows a distribution of the sound pressure level SPL at the position of the polar angle of 90 degrees and (b) shows a distribution of the sound pressure level SPL at the position of the polar angle of 160 degrees. The polar angle is an angle range in which the nose of the aircraft is at 0 degrees, the direction perpendicular to the exhaust port of the exhaust nozzle is at 90 degrees, and the tail on the aircraft is at 180 degrees. That is, (a) shows a distribution of the sound pressure level SPL on a lateral side of the rear portion of the aircraft (upstream side) and (b) shows a distribution of the sound pressure level SPL on the downstream side.

On both the lateral side of the rear portion of the aircraft in (a) and the downstream side in (b), the sound pressure level of low-frequency components of jet noise caused by the exhaust nozzle #4 is lower than the sound pressure level of low-frequency components of jet noise caused by the exhaust nozzle (Baseline) with no projecting sections. Furthermore, the sound pressure level of the low-frequency components in the exhaust nozzle #4 is lower than in the exhaust nozzles #7, #8 on both the lateral side of the rear portion of the aircraft in (a) and the downstream side in (b). In particular, regarding the amount of reduction of the sound pressure level of low-frequency components of jet noise caused by the exhaust nozzle #4 with respect to the Baseline, it is larger on the lateral side of the rear portion of the aircraft in (a) than on the downstream side in (b).

However, on both the lateral side of the rear portion of the aircraft in (a) and the downstream side in (b), the sound pressure level of high-frequency components of jet noise caused by the exhaust nozzle #4 is higher than the sound pressure level of high-frequency components of jet noise caused by the exhaust nozzle (Baseline) with no projecting sections. In particular, regarding the increase in the sound pressure level of high-frequency components of jet noise caused by the exhaust nozzle #4 with respect to the Baseline, it is larger on the lateral side of the rear portion of the aircraft in (a) than on the downstream side in (b).

In other words, the exhaust nozzle #4 has the largest effect in reducing jet noise having the low-frequency components while jet noise having the high-frequency components increases.

The sound pressure level of all frequency components of the exhaust nozzle #7 is lower than in the Baseline on both the lateral side of the rear portion of the aircraft in (a) and the downstream side in (b). That is, the exhaust nozzle #7 reduces jet noise at a good balance. However, on both the lateral side of the rear portion of the aircraft and the downstream side, the sound pressure level of the low-frequency components in the exhaust nozzle #7 is higher than in the exhaust nozzle #4. In other words, the effect of reducing jet noise having the low-frequency components is higher in the exhaust nozzle #4 than in the exhaust nozzle #7.

On the lateral side of the rear portion of the aircraft in (a), the sound pressure level of all frequency components of the exhaust nozzle #8 is lower than in the Baseline while it is not lower as compared to the exhaust nozzle #7. On the other hand, regarding the exhaust nozzle #8, the sound pressure level of all frequency components on the downstream side in (b) is substantially equal to the Baseline. In other words, with the exhaust nozzle #8, the effect of reducing jet noise is relatively low on the lateral side of the rear portion of the aircraft and the effect of reducing jet noise is substantially zero on the downstream side.

Figure 19:
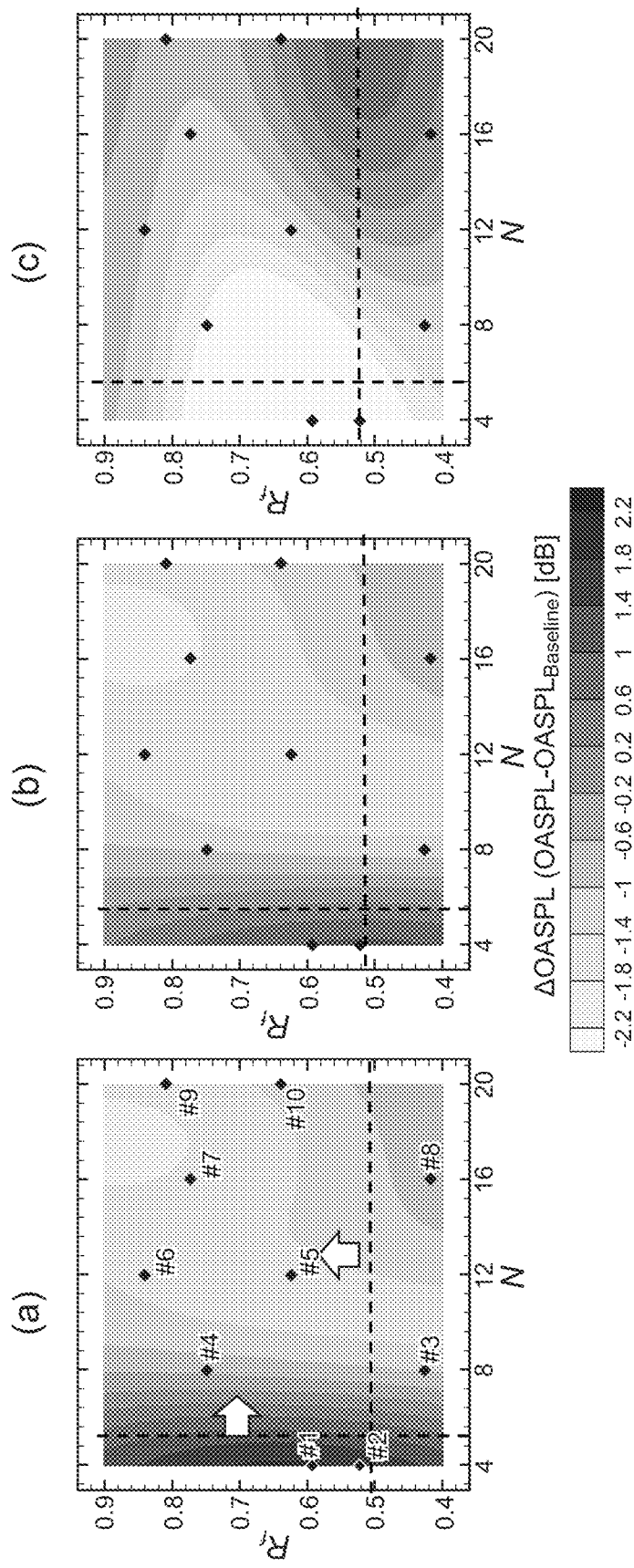
FIG. 19 is contour maps showing the amount of noise reduction depending on the projecting section shape of the exhaust nozzle.

FIG. 19 is contour maps showing the amount of noise reduction depending on the shape of the projecting sections of the exhaust nozzle.

FIG. 19 shows the amount of noise reduction ΔOASPL (=OASPL−OASPL Baseline) (dB) with respect to the noise level (OASPL Baseline) of the exhaust nozzle (reference value: Baseline) with no projecting sections in a case where the shield 13 is not provided. FIG. 19 shows the amount of noise reduction ΔOASPL of the exhaust nozzles #1, #4, #7, #8 and the exhaust nozzles #2, #3, #5, #6, #9, #10 having still other shape variations. The cross-sectional areas of exits of exhaust ports of the exhaust nozzles #1 to #10 are all equal and the number N of projecting sections and the length Rf of the one side of the projecting section are different from one another. FIG. 19 shows the amount of noise reduction ΔOASPL of the exhaust nozzles #1 to #10 at the polar angle of 90 degrees (a), at the polar angle of 120 degrees (b), and at the polar angle of 160 degrees (c). The lower scale of the figure means that the amount of noise reduction becomes larger (on the left side of the scale) as it becomes closer to ΔOASPL=−2.2 dB (negative side) and the amount of noise increase becomes larger (on the right side of the scale) as it becomes closer to ΔOASPL=2.2 dB (positive side) in contrast.

The XY-coordinate system of the contour map shows the shape of the exhaust nozzle #1 to #10. The X-axis indicates the number N of projecting sections of the exhaust nozzle #1 to #10. The Y-axis indicates the length Rf of the one side of the projecting section (i.e., provided that the length of the one side of the regular polygon having the N-number of sides constituted by the exhaust port of the exhaust nozzle is 1, the length of the side folded inside the exhaust port with respect to the one side of the regular polygon having the N-number of sides). For example, the XY-coordinates of the exhaust nozzle #4 mean that the number N of projecting sections of the exhaust nozzle #4 is eight and the length Rf of the one side of the projecting section equals 0.75.

At the positions of the polar angle of 90 degrees (a) and the polar angle of 120 degrees (b), the amount of noise reduction of the exhaust nozzle #1, #2 where N≤4 (specifically, N=4) is a positive value, and it means that the amount of noise increase is large. On the other hand, the amount of noise reduction of the exhaust nozzles #3 to #10 (N>4) is a negative value, and noise is reduced. Therefore, N>4 (i.e., N≥5) is favorable.

In view of this, focusing on N>4, at the positions of all the polar angles (90 degrees, 120 degrees, 160 degrees), the amount of noise reduction in a case where Rf≤0.5 is established is relatively small (i.e., as compared to a case where Rf>0.5 is established). In particular, in a case where Rf≤0.5 is established at the position of the polar angle of 160 degrees (c), the range of N where the amount of noise reduction decreases is wide. Rf≤0.5 means that the amount of projection of the projecting section into the exhaust flow path is small (similar to the circular shape). When the amount of projection of the projecting section into the exhaust flow path is small, a desired acoustic change cannot be obtained. Therefore, Rf≤0.5 does not make a clear difference from the circular exit. In other words, the amount of noise reduction in a case where Rf>0.5 is established is relatively large (i.e., as compared to a case where Rf≤0.5 is established), and therefore it is favorable to set Rf>0.5.

6. Validation Tests of Noise Reduction Effect in Case Where Exhaust Nozzle and Shield Are Both Used: First Validation Test Validation tests were conducted in order to verify jet noise reduction in a case where the exhaust nozzle 100 and the shield 13 are used.

Figure 20:
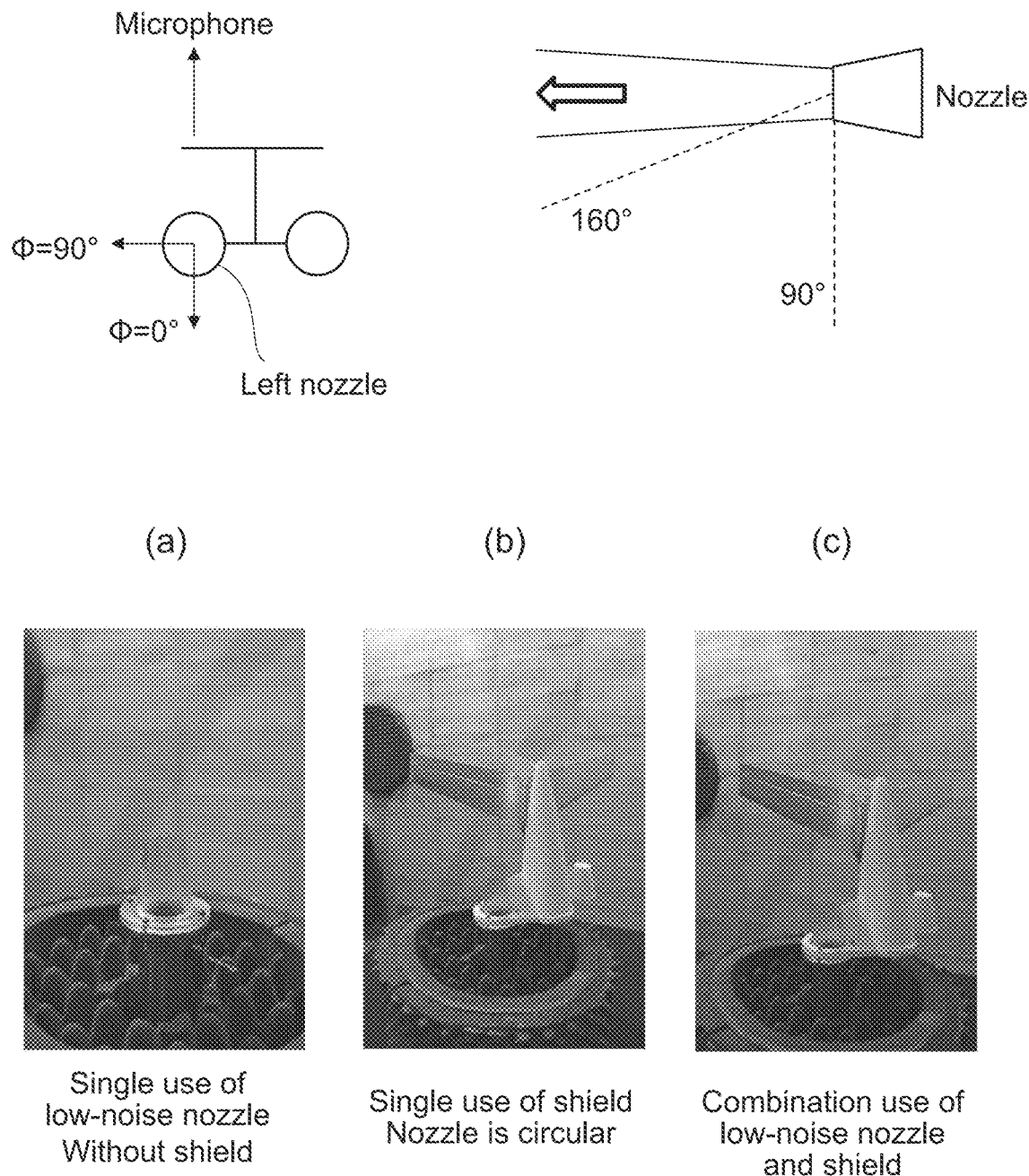
FIG. 20 is diagrams for describing a validation test method.

FIG. 20 is diagrams for describing a validation test method.

Regarding each of three types of exhaust nozzles #1, #4, #7, models in (a) a case where the exhaust nozzle #1, #4, #7 was used and the shield 13 was not used, (b) a case where the shield 13 was used and the exhaust nozzle having the circular exit was used, and (c) a case where the exhaust nozzle #1, #4, #7 and the shield 13 were used were manufactured. (c) Using both the exhaust nozzle #1, #4, #7 and the shield 13 is an example of this embodiment. On the other hand, (a) and (b) are comparative examples. Models of the left nozzle were manufactured and the jet engine was powered on. A microphone was installed behind the left nozzle model in the exhaust direction and the amount of noise reduction (dB) was measured in a range of the polar angle=90 to 160 degrees. The polar angle was in an angle range in which the nose of the aircraft was at 0 degrees, the direction perpendicular to the exhaust port of the exhaust nozzle was at 90 degrees, and the tail on the aircraft was at 180 degrees.

Figure 21:
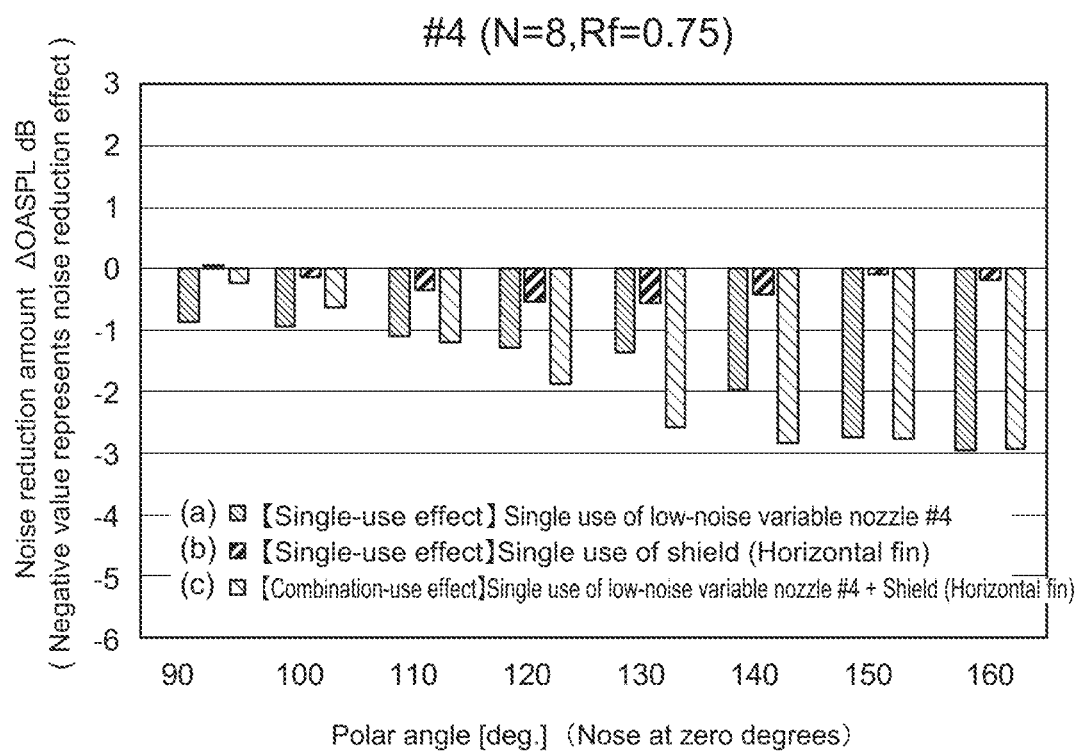
FIG. 21 shows validation test results of an exhaust nozzle #4.

FIG. 21 shows validation test results of the exhaust nozzle #4.

FIG. 21 shows the amount of noise reduction ΔOASPL (dB) in the range of the polar angle=90 to 160 degrees in (a) a case where the exhaust nozzle #4 was used and the shield 13 was not used (comparative example), (b) a case where the shield 13 was used and the exhaust nozzle having the circular exit was used (comparative example), and (c) a case where the exhaust nozzle #4 and the shield 13 were both used (this embodiment). It indicates that the amount of noise reduction becomes larger as the value on the negative side (i.e., the side smaller than zero) becomes larger. In contrast, it indicates that the amount of noise increase becomes larger as the value on the positive side (i.e., the side larger than zero) becomes larger.

In a range of the polar angle of 110 degrees or more and 140 degrees or less, the amount of jet noise reduction in (c) the case where the exhaust nozzle #4 and the shield 13 were both used (this embodiment) is larger than the amount of jet noise reduction in (a) the case where the exhaust nozzle #4 was used and the shield 13 was not used (comparative example) (c>a).

On the other hand, in a range of the polar angle larger than 140 degrees and equal to or smaller than 160 degrees, the amount of jet noise reduction in (c) the case where the exhaust nozzle #4 and the shield 13 were both used (this embodiment) did not substantially change. In other words, even in the range of the polar angle larger than 140 degrees and equal to or smaller than 160 degrees, the amount of jet noise reduction in (c) the case where the exhaust nozzle #4 and the shield 13 were both used (this embodiment) is sufficiently large.

Furthermore, in a range of the polar angle of 120 degrees or more and 140 degrees or less, the amount of jet noise reduction in (c) the case where the exhaust nozzle #4 and the shield 13 were both used (this embodiment) are larger than the sum of the amount of jet noise reduction in (a) the case where the exhaust nozzle #4 was used and the shield 13 was not used (comparative example) and the amount of jet noise reduction in (b) the case where the shield 13 was used and the exhaust nozzle having the circular exit was used (comparative example) (c>a+b). In other words, by (c) using both the exhaust nozzle #4 and the shield 13 (this embodiment), a higher effect than a simply expected effect (sum of a+b) can be obtained in the range of the polar angle of 120 degrees or more and 140 degrees or less.

As described above with reference to FIG. 18, the exhaust nozzle #4 has the largest effect in reducing jet noise having the low-frequency components while jet noise having the high-frequency components increases. However, in this embodiment, as described above with reference to (B) of FIG. 9, the exhaust nozzle 100 is used to generate a sound source of the high-frequency components at a position at which the shield 13 is capable of shielding the high-frequency components of the engine exhaust flows 15. Accordingly, since the shield 13 shields the high-frequency components of the engine exhaust flows 15, it reduces jet noise having the high-frequency components. Therefore, the exhaust nozzle #4 increases jet noise having the high-frequency components (see FIG. 18), and the shield 13 is nevertheless capable of shielding jet noise having the high-frequency components. Therefore, in (c) the case where the exhaust nozzle #4 and the shield 13 were both used (this embodiment), jet noise can be greatly reduced as compared to (a) the case where the exhaust nozzle #4 was used and the shield 13 was not used (comparative example).

Figure 22:
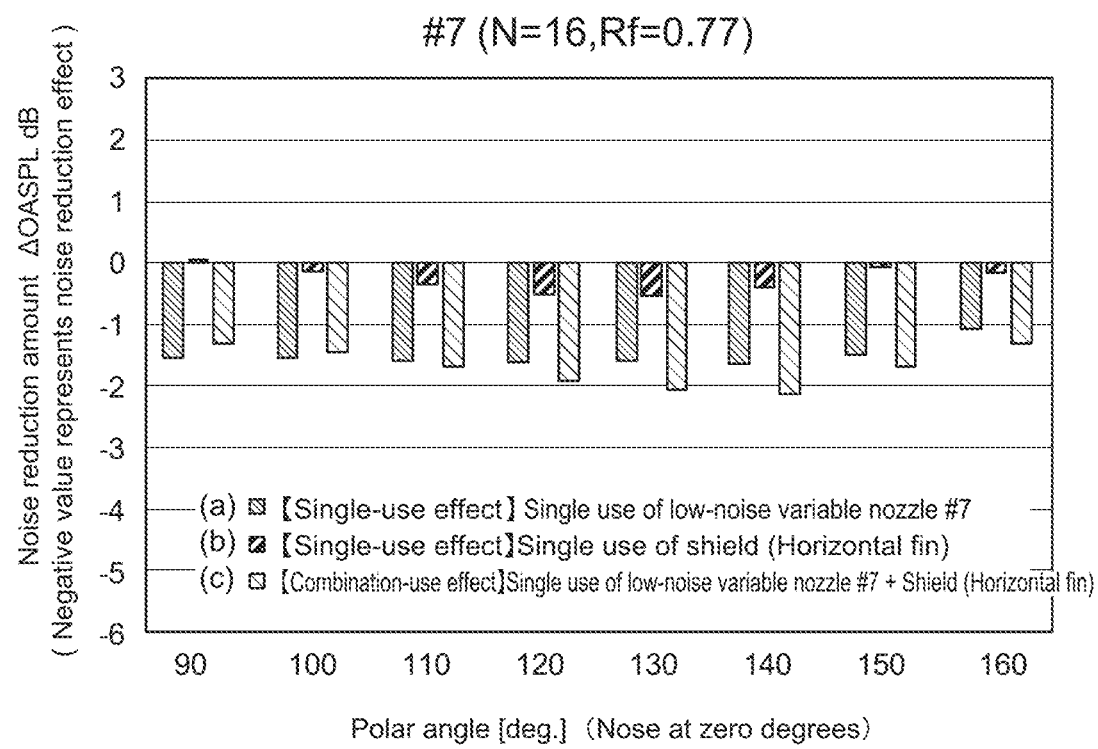
FIG. 22 shows validation test results of an exhaust nozzle #7.

FIG. 22 shows validation test results of the exhaust nozzle #7.

FIG. 22 shows the amount of noise reduction ΔOASPL (dB) in the range of the polar angle=90 to 160 degrees in (a) a case where the exhaust nozzle #7 was used and the shield 13 was not used (comparative example), (b) a case where the shield 13 was used and the exhaust nozzle having the circular exit was used (comparative example), and (c) a case where the exhaust nozzle #7 and the shield 13 were both used (this embodiment).

In a range of the polar angle of 110 degrees or more and 160 degrees or less, the amount of jet noise reduction in (c) the case where the exhaust nozzle #7 and the shield 13 were both used (this embodiment) is larger than the amount of jet noise reduction in (a) the case where the exhaust nozzle #7 was used and the shield 13 was not used (comparative example) (c>a). As shown in FIG. 21, in the case where the exhaust nozzle #4 and the shield 13 were both used, the amount of jet noise reduction in the range of the polar angle of 110 degrees or more and 140 degrees or less is larger than the amount of jet noise reduction in the comparative example (a). Therefore, by using both the exhaust nozzle #7 and the shield 13, jet noise can be reduced in a wider range at a good balance.

Furthermore, in a range of the polar angle of 140 degrees or more and 160 degrees or less, the amount of jet noise reduction in (c) the case where the exhaust nozzle #7 and the shield 13 were both used (this embodiment) is larger than the sum of the amount of jet noise reduction in (a) the case where the exhaust nozzle #7 was used and the shield 13 was not used (comparative example) and the amount of jet noise reduction in (b) the case where the shield 13 was used and the exhaust nozzle having the circular exit was used (comparative example) (c>a+b). In other words, by (c) using both the exhaust nozzle #7 and the shield 13 (this embodiment), a higher effect than a simply expected effect (sum of a+b) can be obtained in the range of the polar angle of 140 degrees or more and 160 degrees or less.

As described above, with (c) both the exhaust nozzle #4 or #7 and the shield 13 (this embodiment), the amount of jet noise reduction in (c) the case where the exhaust nozzle 100 and the shield 13 were used is, in the range of the polar angle of 110 degrees or more and 140 degrees or less, larger than the amount of jet noise reduction in (a) the case where the exhaust nozzle 100 was used and the shield 13 was not used. In addition, a higher effect than the simply expected effect (sum of a+b) can be obtained at the polar angle of 140 degrees.

In a case of reducing jet noise of the aircraft flying horizontally above the head, the influence of the polar angle is not uniform. Jet noise of commercial supersonic aircraft expected to go into service in the future has a distribution taking a maximum value at the polar angle of approximately 140 to 160 degrees. Moreover, noise decreases inversely proportional to the square of the propagation distance due to spherical spreading, and noise is greatly attenuated in the downstream direction (e.g., 160 degrees), in which the distance to the observer increases, during the propagation. Therefore, noise that the observer can feel becomes maximum at the polar angle of approximately 140 to 150 degrees (see FIG. 26). In this embodiment, the noise reduction effect especially at the polar angle of about 140 degrees can be improved by using both the exhaust nozzle 100 and the shield 13.

Figure 23:
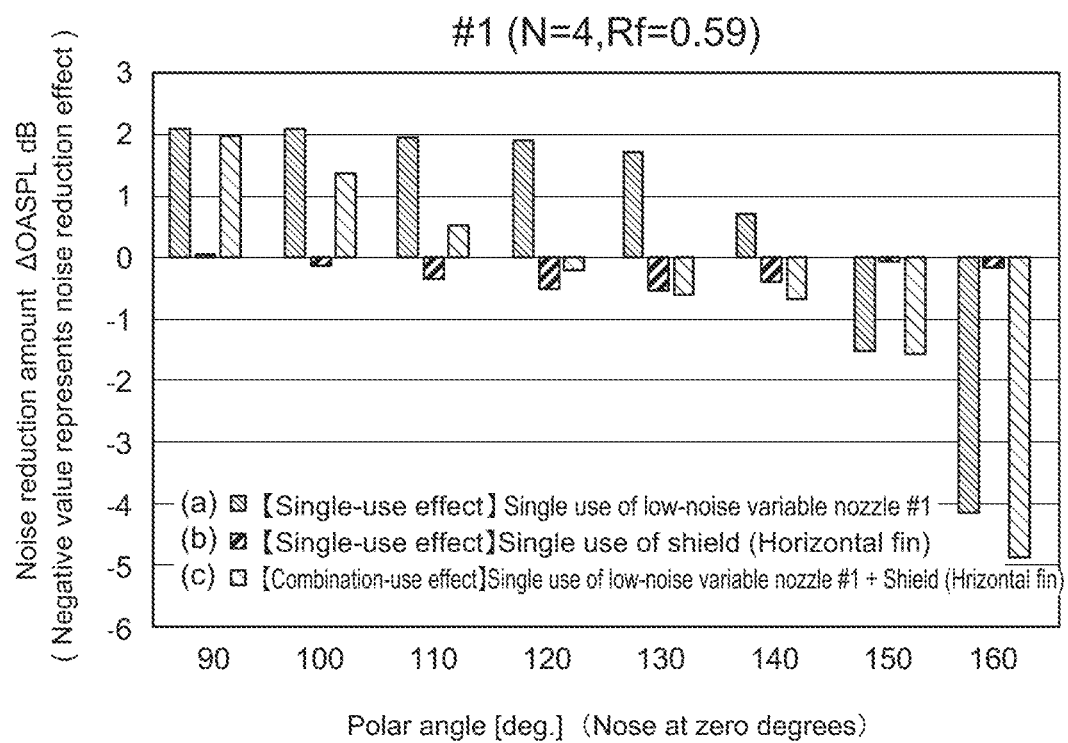
FIG. 23 shows validation test results of an exhaust nozzle #1.

FIG. 23 shows validation test results of the exhaust nozzle #1.

FIG. 23 shows the amount of noise reduction ΔOASPL (dB) in the range of the polar angle=90 to 160 degrees in (a) a case where the exhaust nozzle #1 was used and the shield 13 was not used (comparative example), (b) a case where the shield 13 was used and the exhaust nozzle having the circular exit was used (comparative example), and (c) a case where the exhaust nozzle #1 and the shield 13 were both used (this embodiment).

In a range of the polar angle of 90 degrees or more and 160 degrees or less, the amount of jet noise reduction in (c) the case where the exhaust nozzle #1 and the shield 13 were both used (this embodiment) is larger than the amount of jet noise reduction in (a) the case where the exhaust nozzle #1 was used and the shield 13 was not used (comparative example) (c>a). In other words, by (c) using both the exhaust nozzle #1 and the shield 13 (this embodiment), a higher effect than the simply expected effect (sum of a+b) can be obtained.

Furthermore, in the range of the polar angle of 90 degrees or more and 160 degrees or less, the amount of jet noise reduction in (c) the case where the exhaust nozzle #1 and the shield 13 were both used (this embodiment) is larger than the sum of the amount of jet noise reduction in (a) the case where the exhaust nozzle #1 was used and the shield 13 was not used (comparative example) and the amount of jet noise reduction in (b) the case where the shield 13 was used and the exhaust nozzle having the circular exit was used (comparative example) (c>a+b). In other words, by (c) using both the exhaust nozzle #1 and the shield 13 (this embodiment), a higher effect than the simply expected effect (sum of a+b) can be obtained.

However, the value on the positive side (i.e., the side larger than zero) of ΔOASPL in the comparative example (a) is excessively high, that is, the amount of noise increase is excessively large. That is as described above with reference to (a) and (b) of FIG. 19, in which the amount of noise increase of the exhaust nozzle #1 is larger (positive value) at the positions of the polar angles of 90 degrees and 120 degrees. Since the amount of increase of noise that the exhaust nozzle #1 itself generates is excessively large, the amount of noise increase is still large even by also using the shield 13. That is, even in a case where the exhaust nozzle #1 and the shield 13 are both used, a suitable noise reduction effect cannot be obtained, and it is not practical.

7. Validation Tests of Noise Reduction Effect in Case Where Exhaust Nozzle and Shield Are Both Used: Second Validation Test Next, still another validation test for verifying jet noise reduction in a case where the exhaust nozzle 100 and the shield 13 were both used will be described.

Figure 27:
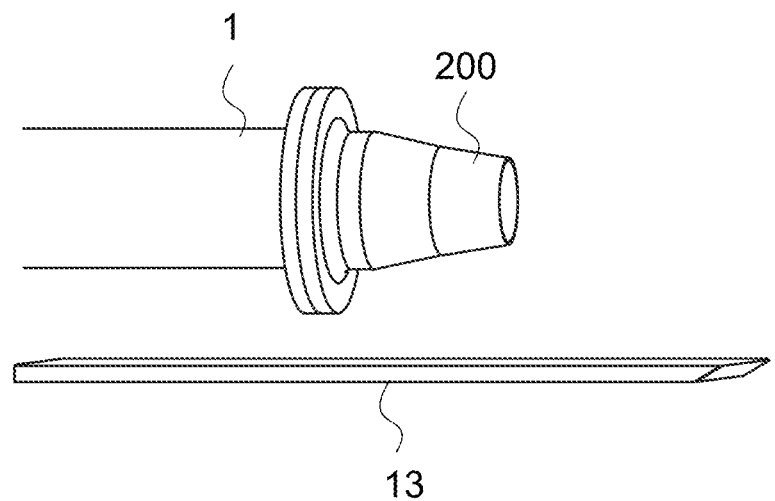
FIG. 27 is a side view in a case where an exhaust nozzle (Baseline) having a circular exit was used (comparative example) in a second validation test.
Figure 28:
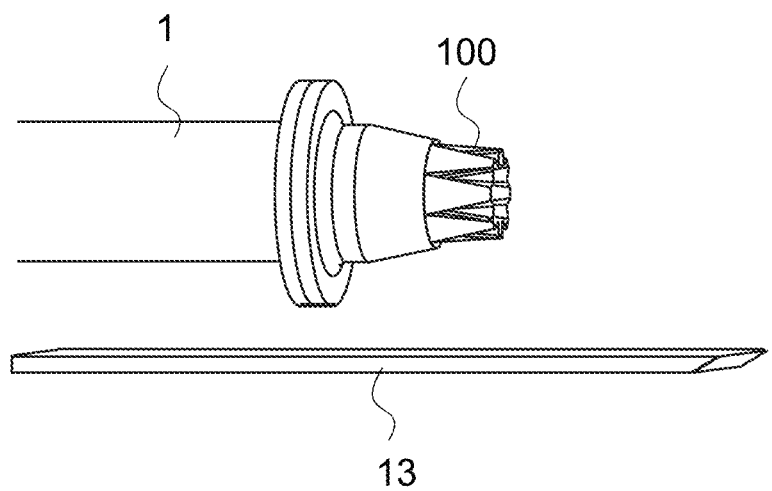
FIG. 28 is a side view in a case where a petal-shaped exhaust nozzle was used (this embodiment) in the second validation test.

FIGS. 27 to 32 are diagrams showing a second validation test. FIG. 27 is a side view in a case where the exhaust nozzle 200 having the circular exit (Baseline) was used (comparative example) in the second validation test. FIG. 28 is a side view in a case where a petal-shaped exhaust nozzle 100 was used (this embodiment) in the second validation test.

Figure 29:
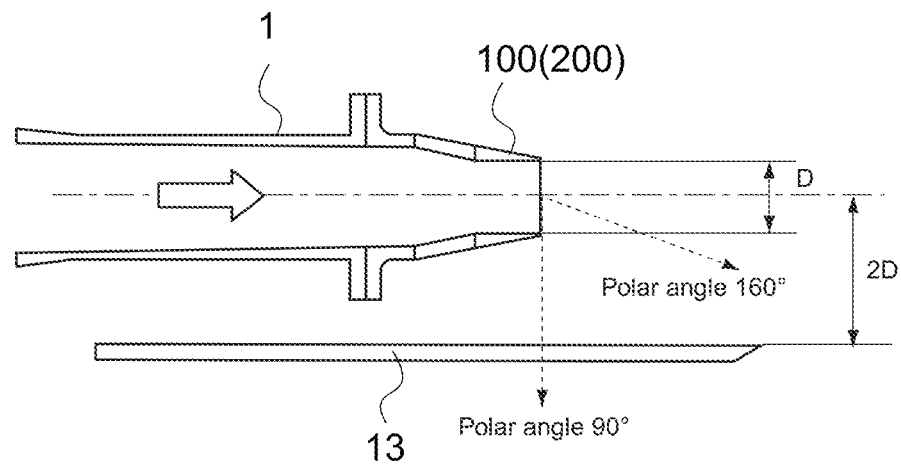
FIG. 29 is a cross-sectional side view showing the second validation test.
Figure 30:
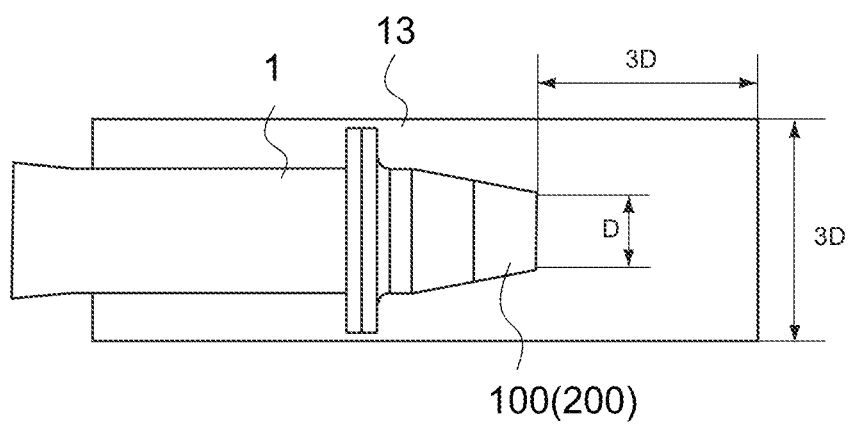
FIG. 30 is a plan view showing the second validation test.
Figure 31:
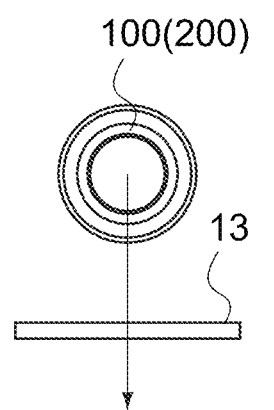
FIG. 31 is a diagram as the second validation test is viewed from an exhaust port side of the exhaust nozzle.

FIG. 29 is a cross-sectional side view showing the second validation test. FIG. 30 is a plan view showing the second validation test. FIG. 31 is a diagram as the second validation test is viewed from the exhaust port side of the exhaust nozzle 100, 200.

Figure 32:
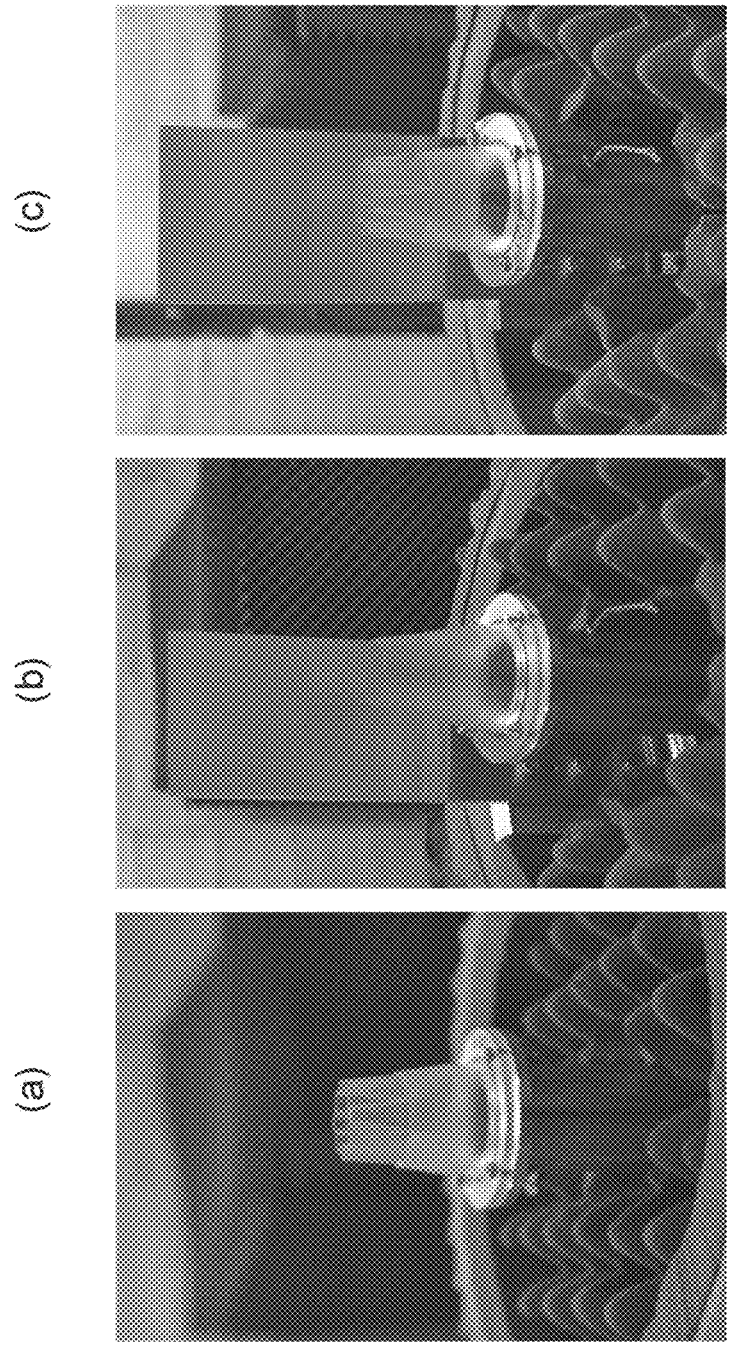
FIG. 32 is perspective views showing the second validation test.

FIG. 32 is perspective views showing the second validation test. FIG. 32(a) shows a case where the exhaust nozzle 100 according to this embodiment was used and the shield 13 was not used (comparative example). FIG. 32(b) shows a case where the exhaust nozzle 200 having the circular exit according to the comparative example and the shield 13 was used (comparative example). Moreover, FIG. 32(c) shows a case where the exhaust nozzle 100 according to this embodiment and the shield 13 were both used (this embodiment).

As shown in FIGS. 27 and 28, in the second validation test, the exhaust nozzle 200 (model) having the circular exit according to the comparative example or the petal-shaped exhaust nozzle 100 (model) according to this embodiment is attached to the rear end side (exhaust port) of the engine nacelle 1 (jet engine) (model).

In the second validation test, four types of exhaust nozzles #1, #4, #5, #7 were used as the petal-shaped exhaust nozzle 100 (see FIG. 17). It should be noted that in the above-mentioned first validation test, three types of exhaust nozzles #1, #4, and #7 were used, and the exhaust nozzle #5 was thus added in the second validation test.

Moreover, in the second validation test, the shield 13 (model) was used. The shield 13 is a flat plate-like member and is disposed in parallel to a center axis direction of the engine nacelle 1 and the exhaust nozzle 100, 200.

As shown in FIG. 29, the shield 13 is disposed at a distance of 2D from the center axis (see the long dashed short dashed line) of the engine nacelle 1 and the exhaust nozzle 100, 200. It should be noted that the value of D means the diameter of the exhaust port of the exhaust nozzle 100, 200. In the example hare, the value of D was set to 28.8 mm.

Moreover, as shown in FIG. 30, the width of the shield 13 was set to 3D and the shield 13 was disposed so that the center position of the shield 13 in the width direction coincided with the center axis position of the engine nacelle 1 and the exhaust nozzle 100, 200. Moreover, as shown in FIG. 30, the length of the shield 13, which projects rearward from the exhaust port of the exhaust nozzle 100, 200, was set to 3D.

The microphone was deposed on the back side of the shield 13 (see FIG. 31) and the amount of noise reduction (dB) was measured in the range of the polar angle=90 to 160 degrees (see FIG. 29). It should be noted that Mach number Mj of the jet engine was set to 0.98.

Sampling of noise recording was conducted at 204.8 kHz. Noise assessment was conducted in a range of 400 Hz (the lower limit frequency in an anechoic chamber where the validation test was conducted) to 80 kHz (the upper limit frequency of recording) at the ⅓ octave band center frequency. It should be noted that the OASPL in FIGS. 33 to 36 to be described later is an integrated value in this frequency range, and the amount of noise reduction ΔOASPL (dB) is each OASPL−OASPL (Baseline).

Figure 33:
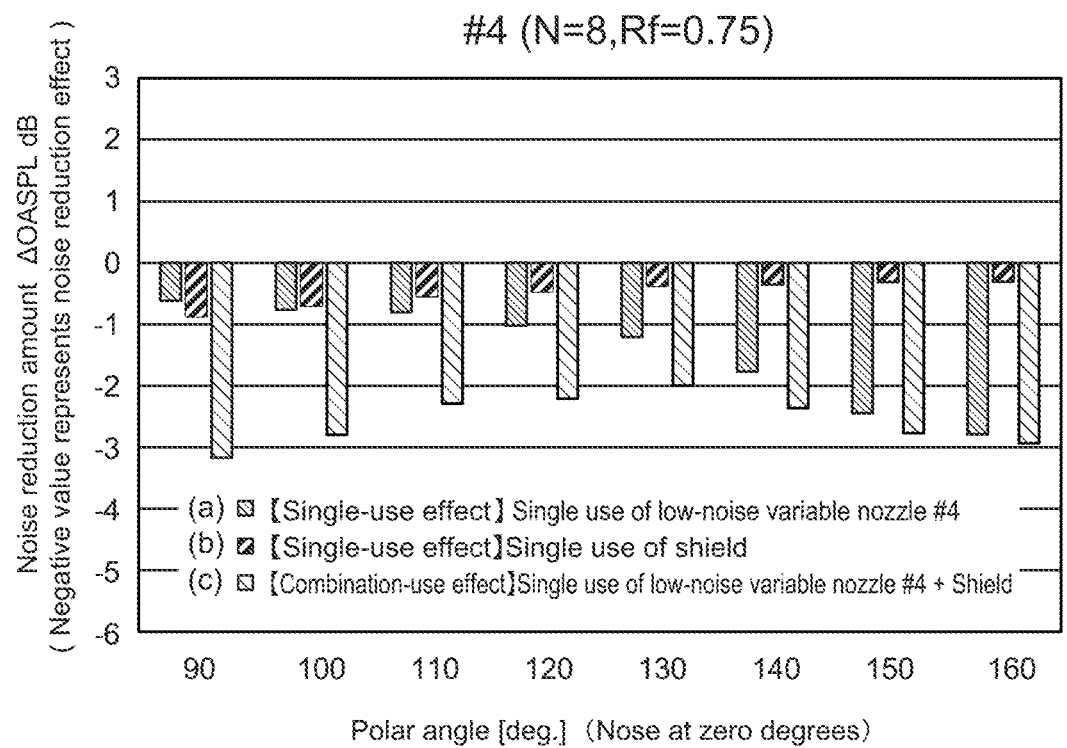
FIG. 33 shows second validation test results of the exhaust nozzle #4.

FIG. 33 shows second validation test results of the exhaust nozzle #4.

FIG. 33 shows the amount of noise reduction ΔOASPL (dB) in the range of the polar angle=90 to 160 degrees in (a) a case where the exhaust nozzle #4 was used and the shield 13 was not used (comparative example), (b) a case where the shield 13 was used and the exhaust nozzle having the circular exit was used (comparative example), and (c) a case where the exhaust nozzle #4 and the shield 13 were both used (this embodiment). It indicates that the amount of noise reduction becomes larger as the value on the negative side (i.e., the side smaller than zero) becomes larger. In contrast, it indicates that the amount of noise increase becomes larger as the value on the positive side (i.e., the side larger than zero) becomes larger.

In the range of the polar angle of 90 degrees or more and 160 degrees or less (entire range), the amount of jet noise reduction in (c) the case where the exhaust nozzle #4 and the shield 13 were both used (this embodiment) is larger than the amount of jet noise reduction in (a) the case where the exhaust nozzle #4 was used and the shield 13 was not used (comparative example) (c>a).

In addition, in a range of the polar angle of 90 degrees or more and 140 degrees or less, the amount of jet noise reduction in (c) the case where the exhaust nozzle #4 and the shield 13 were both used (this embodiment) is larger than the sum of the amount of jet noise reduction in (a) the case where the exhaust nozzle #4 was used and the shield 13 was not used (comparative example) and the amount of jet noise reduction in (b) the case where only the shield 13 was used (comparative example) (c>a+b). In other words, by (c) using both the exhaust nozzle #4 and the shield 13 (this embodiment), a higher effect than a simply expected effect (sum of a+b) can be obtained in the range of the polar angle of 90 degrees or more and 140 degrees or less.

On the other hand, in a range of the polar angle of 150 degrees or more and 160 degrees or less, c>a+b is not established, and that is because with the size of the shield 13 used in the second validation test, the shielding effect is weak in this direction and the noise reduction effect of the single use of the exhaust nozzle #4 is dominant. At this time, although the shielding effect of the shield 13 is weak, a significant noise reduction effect can be obtained due to the effect of the single use of the exhaust nozzle #4, and its level is sufficiently high.

Figure 34:
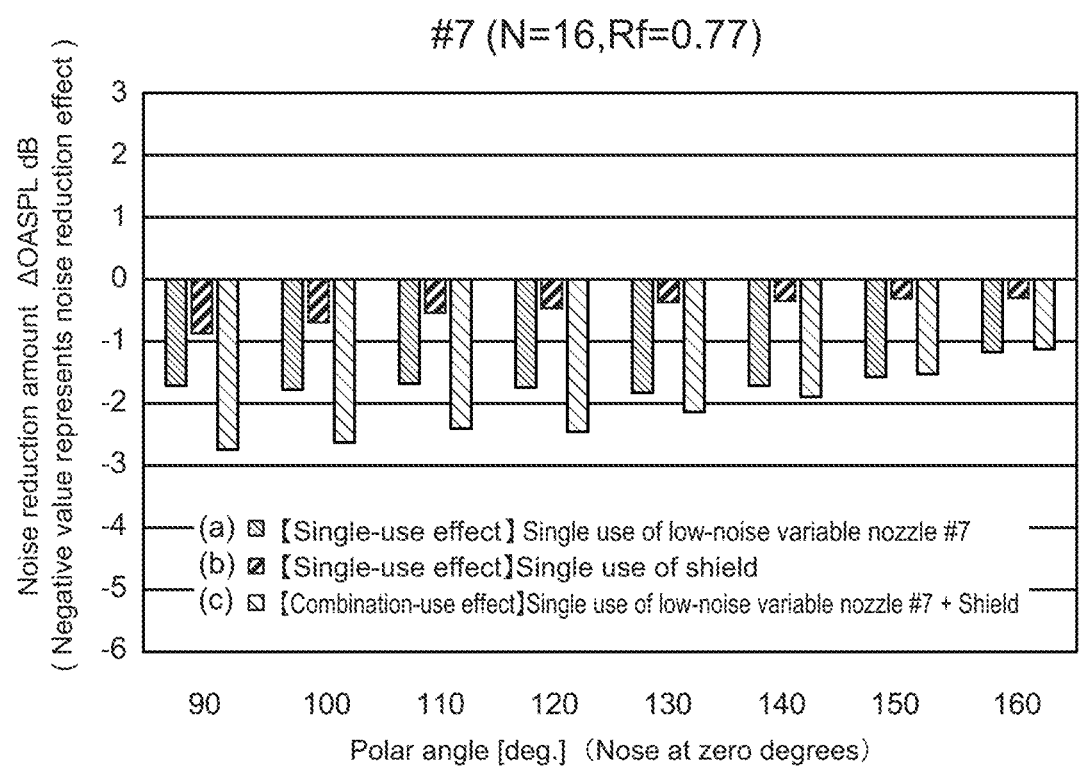
FIG. 34 shows second validation test results of the exhaust nozzle #7.

FIG. 34 shows second validation test results of the exhaust nozzle #7.

FIG. 34 shows the amount of noise reduction ΔOASPL (dB) in the range of the polar angle=90 to 160 degrees in (a) a case where the exhaust nozzle #7 was used and the shield 13 was not used (comparative example), (b) a case where the shield 13 was used and the exhaust nozzle having the circular exit was used (comparative example), and (c) a case where the exhaust nozzle #7 and the shield 13 were both used (this embodiment).

In the range of the polar angle of 90 degrees or more and 140 degrees or less, the amount of jet noise reduction in (c) the case where the exhaust nozzle #7 and the shield 13 were both used (this embodiment) is larger than the amount of jet noise reduction in (a) the case where the exhaust nozzle #7 was used and the shield 13 was not used (comparative example) (c>a).

Moreover, in the range of the polar angle of 90 degrees or more and 140 degrees or less, the amount of jet noise reduction in (c) the case where the exhaust nozzle #7 and the shield 13 were both used (this embodiment) is substantially equal to the sum of the amount of jet noise reduction in (a) the case where the exhaust nozzle #7 was used and the shield 13 was not used (comparative example) and the amount of jet noise reduction in (b) the case where only the shield 13 was used (comparative example) (c≈a+b). In other words, in (c) the case where the exhaust nozzle #7 and the shield 13 were both used (this embodiment), an effect equivalent to the expected effect (sum of a+b) can be obtained in the range of the polar angle of 90 degrees or more and 140 degrees or less.

On the other hand, in the range of the polar angle of 150 degrees or more and 160 degrees or less, c is smaller than a+b, and that is because with the size of the shield 13 used in the second validation n test, the shielding effect is weak in this direction and the noise reduction effect of the single use of the exhaust nozzle #7 is dominant. At this time, although the shielding effect of the shield 13 is weak, a significant noise reduction effect can be obtained due to the effect of the single use of the exhaust nozzle #7, and its level is lower as compared to the exhaust nozzle #4.

Figure 35:
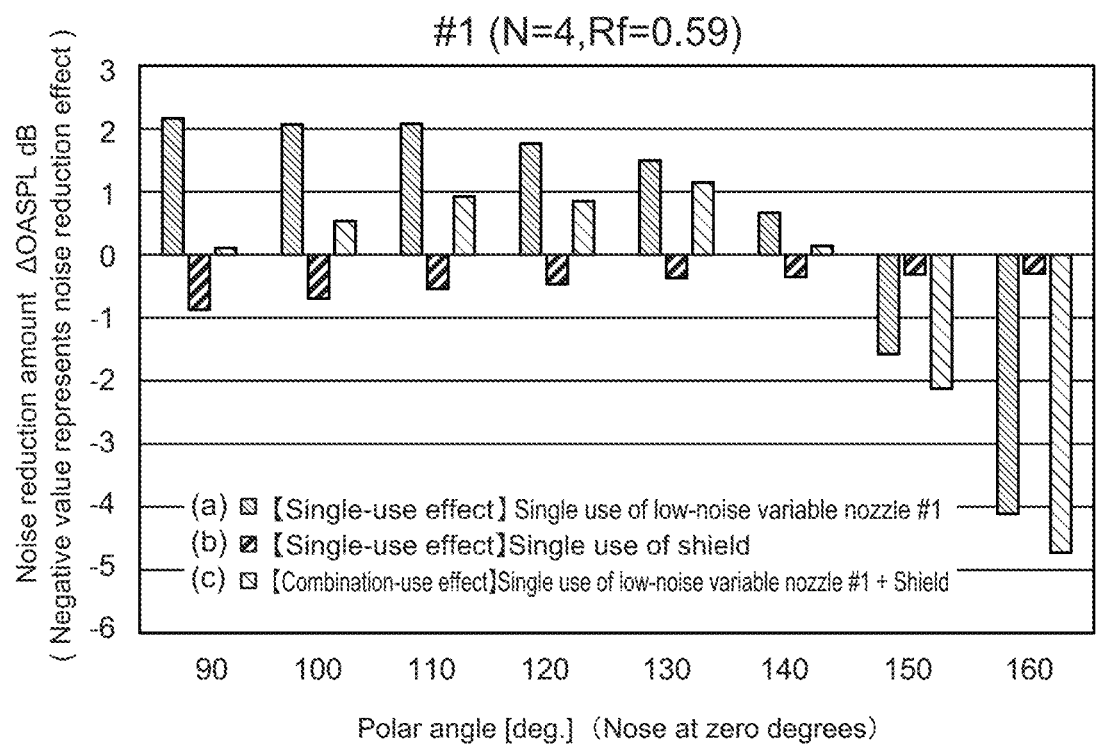
FIG. 35 shows second validation test results of the exhaust nozzle #1.

FIG. 35 shows second validation test results of the exhaust nozzle #1.

FIG. 35 shows the amount of noise reduction ΔOASPL (dB) in the range of the polar angle=90 to 160 degrees in (a) a case where the exhaust nozzle #1 was used and the shield 13 was not used (comparative example), (b) a case where the shield 13 was used and the exhaust nozzle having the circular exit was used (comparative example), and (c) a case where the exhaust nozzle #1 and the shield 13 were both used (this embodiment).

In the range of the polar angle of 90 degrees or more and 160 degrees or less (entire range), the amount of jet noise reduction in (c) the case where the exhaust nozzle #1 and the shield 13 were both used (this embodiment) is larger than the amount of jet noise reduction in (a) the case where the exhaust nozzle #1 was used and the shield 13 was not used (comparative example) (c>a).

Moreover, in the range of the polar angle of 90 degrees or more and 160 degrees or less (entire range), the amount of jet noise reduction in (c) the case where the exhaust nozzle #1 and the shield 13 were both used (this embodiment) is larger than the sum of the amount of jet noise reduction in (a) the case where the exhaust nozzle #1 was used and the shield 13 was not used (comparative example) and the amount of jet noise reduction in (b) the case where only the shield 13 was used (comparative example) (c>a+b). In other words, by (c) using both the exhaust nozzle #1 and the shield 13 (this embodiment), a higher effect than a simply expected effect (sum of a+b) can be obtained in the range of the polar angle of 90 degrees or more and 160 degrees or less.

However, in FIG. 35, since the noise reduction effect of the single use of the exhaust nozzle #1 is excessively biased in the direction of the polar angle of 160 degrees, it results in a noise increase (positive side) in the range of the polar angle of 90 degrees or more and 140 degrees or less, even including the noise reduction effect of the shield 13.

Figure 36:
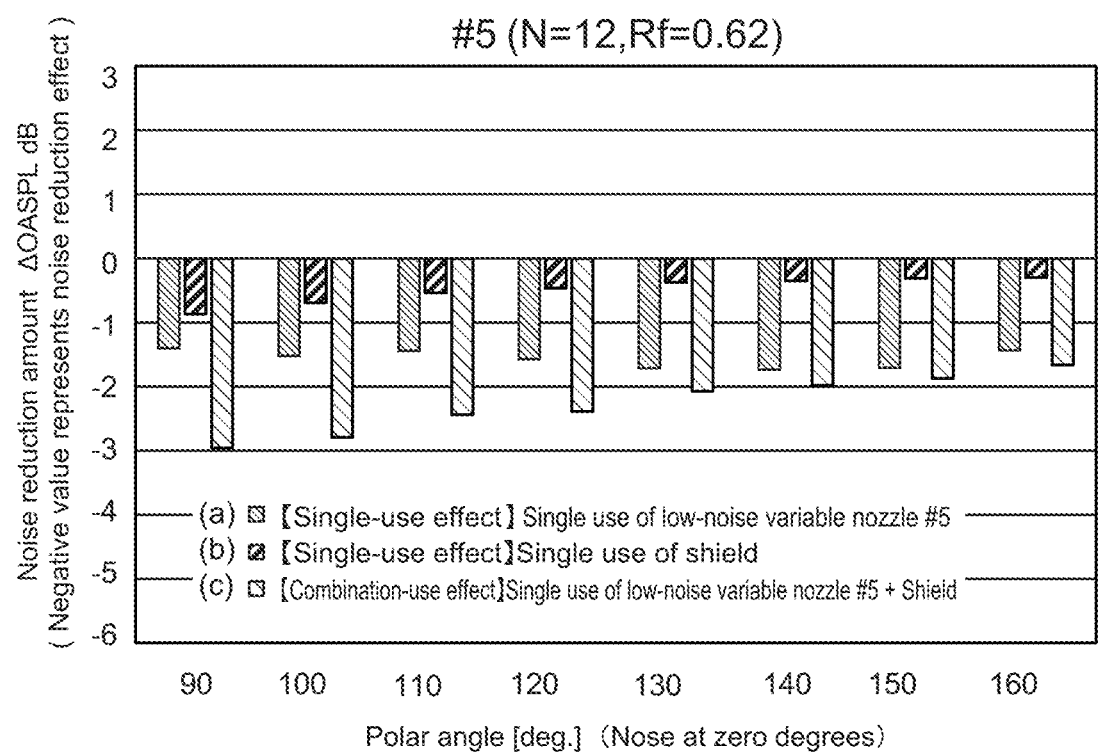
FIG. 36 shows second validation test results of the exhaust nozzle #5.

FIG. 36 shows second validation test results of the exhaust nozzle #5.

FIG. 36 shows the amount of noise reduction ΔOASPL (dB) in the range of the polar angle=90 to 160 degrees in (a) a case where the exhaust nozzle #5 was used and the shield 13 was not used (comparative example), (b) a case where the shield 13 was used and the exhaust nozzle having the circular exit was used (comparative example), and (c) a case where the exhaust nozzle #5 and the shield 13 were both used (this embodiment). It indicates that the amount of noise reduction becomes larger as the value on the negative side (i.e., the side smaller than zero) becomes larger. In contrast, it indicates that the amount of noise increase becomes larger as the value on the positive side (i.e., the side larger than zero) becomes larger.

In the range of the polar angle of 90 degrees or more and 160 degrees or less (entire range), the amount of jet noise reduction in (c) the case where the exhaust nozzle #5 and the shield 13 were both used (this embodiment) is larger than the amount of jet noise reduction in (a) the case where the exhaust nozzle #5 was used and the shield 13 was not used (comparative example) (c>a).

In addition, in a range of the polar angle of 90 degrees or more and 130 degrees or less, the amount of jet noise reduction in (c) the case where the exhaust nozzle #5 and the shield 13 were both used (this embodiment) is larger than the sum of the amount of jet noise reduction in (a) the case where the exhaust nozzle #5 was used and the shield 13 was not used (comparative example) and the amount of jet noise reduction in (b) the case where only the shield 13 was used (comparative example) (c>a+b). In other words, by (c) using both the exhaust nozzle #5 and the shield 13 (this embodiment), a higher effect than a simply expected effect (sum of a+b) can be obtained in the range of the polar angle of 90 degrees or more and 130 degrees or less.

On the other hand, in the range of the polar angle of 140 degrees or more and 160 degrees or less, c>a+b is not established, and that is because with the size of the shield 13 used in the second validation test, the shielding effect is weak in this direction and the noise reduction effect of the single use of the exhaust nozzle #5 is dominant. At this time, although the shielding effect of the shield 13 is weak, a significant noise reduction effect can be obtained due to the effect of the single use of the exhaust nozzle #5, and its level is lower as compared to the exhaust nozzle #4 and higher as compared to the exhaust nozzle #7.

In a case where the exhaust nozzle #5 and the shield 13 were both used, intermediate features between the combination use of the exhaust nozzle #4 and the shield 13 and the combination use of the exhaust nozzle #7 and the shield 13 were obtained.

That is, the range of the polar angle in which a higher effect (c>a+b) than the effect simply expected by using both the exhaust nozzle and the shield 13 is wider in the order of the exhaust nozzle #4, the exhaust nozzle #5, and the exhaust nozzle #7, and it is expected that the noise reduction effect can be controlled by devising the nozzle shape. It implies that the nozzle shape that improves the airport noise reduction effect can be designed in accordance with the shield 13 mounted for the purpose of reducing sonic booms.

8. Conclusion

As described above, in accordance with the supersonic aircraft and the method of reducing sonic booms and jet noise according to this embodiment, the shield 13 shields the engine exhaust flows discharged from the jet engines accommodated in the engine nacelles mounted on the fuselage of the supersonic aircraft, to thereby reduce sonic booms due to the engine exhaust flows. The exhaust nozzles provided in the exhaust ports of the engine nacelles 100 generate sound sources of the high-frequency components at the positions where the shields 13 are capable of shielding the high-frequency components of the engine exhaust flows, to thereby reduce jet noise having the high-frequency components, and promote mixing of the engine exhaust flows that generates low-frequency noise components with the external air flow to thereby reduce jet noise having the low-frequency components.

In accordance with this embodiment, regarding separate problems of reduction of sonic booms during the supersonic cruise and airport noise reduction during the take-off and landing, both the shield 13 designed to reduce sonic booms and the petal-shaped exhaust nozzle 100 are used. Accordingly, a high airport noise reduction effect, which cannot be obtained by a simple combination of the shield 13 and the circular nozzle, can be obtained, and both the reduction of sonic booms and the airport noise reduction, which are major challenges in the environmental compatibility of the supersonic aircraft, can be accomplished.

Establishment of international standards and market development of the supersonic aircraft are in progress, and noise reduction technologies in the related art in the future are expected to be utilized in the manufacture of new types of aircraft.

Although the embodiments and modified examples of the present technology have been described above, the present technology is not limited to the above-mentioned embodiments, and can be variously modified without departing from the gist of the present technology as a matter of course.

What is claimed is:

1. A supersonic aircraft, comprising:
   a shield that shields an engine exhaust flow discharged from a jet engine accommodated in an engine nacelle mounted on a fuselage of the aircraft to thereby reduce sonic booms due to the engine exhaust flow; and
   an exhaust nozzle that is provided in an exhaust port of the engine nacelle and that is configured to generate a sound source for high-frequency components of jet noise at a position at which the shield is capable of shielding the high-frequency components of jet noise due to the engine exhaust flow, to thereby reduce the high-frequency components of jet noise, and is configured to promote mixing of low-frequency components of jet noise due to the engine exhaust flow with an external air flow to thereby reduce the low-frequency components of jet noise,
   wherein the exhaust nozzle extends to the rear of the jet engine and constitutes an exhaust flow path,
   wherein the exhaust nozzle has a plurality of main nozzle pieces and at least one coupling nozzle piece,
   wherein a rear end portion of each of the main nozzle pieces is provided swingably in an inward and outward direction of the exhaust flow path about an open/close bend section, the open/close bend section being formed at a rear end of a throttle section at the rear of the jet engine,
   wherein the coupling nozzle piece is disposed between adjacent main nozzle pieces and is coupled bendably to the main nozzle pieces on either side thereof, the coupling nozzle piece being coupled bendably to the main nozzle pieces at a side bend section, and the coupling nozzle piece having a central bend section that is capable of forming a plurality of projecting sections inside the exhaust flow path in conjunction with a movement of each of the main nozzle pieces,
   wherein, when the main nozzle pieces are swung outward from the exhaust flow path, the coupling nozzle piece forms a flat surface having no projecting section inside the exhaust flow path, and the cross-sectional area of the exhaust flow path is wider toward the rear end portion of the main nozzle pieces from the position of the open/close bend section, and
   wherein, when the main nozzle pieces are swung inside the exhaust flow path, the coupling nozzle piece forms a projecting section inside the exhaust flow path along the exhaust flow path for narrowing the exhaust flow path.

2. The supersonic aircraft according to claim 1, wherein the exhaust nozzle promotes mixing of the high-frequency components of jet noise due to the engine exhaust flow with the external air flow in vicinity of the exhaust port, to thereby generate the sound source for the high-frequency components of jet noise at the position at which the shield is capable of shielding the high-frequency components of jet noise.

3. The supersonic aircraft according to claim 1, wherein the exhaust nozzle has a plurality of projecting sections provided in an inner circumference.

4. The supersonic aircraft according to claim 3, wherein the plurality of projecting sections has an identical shape and an identical size and is provided at equal intervals in a circumferential direction of the exhaust nozzle.

5. The supersonic aircraft according to claim 3, wherein the number N of the plurality of projecting sections is N>4.

6. The supersonic aircraft according to claim 3, wherein the plurality of projecting sections each has two sides projecting in an inner circumferential direction of the exhaust nozzle as the exhaust nozzle is viewed axially, and the lengths of the two sides are equal, and wherein, provided that the number of the plurality of projecting sections is denoted by N and a length of one side of a regular polygon having an N-number of sides is 1, a length Rf of one side of the projecting section is Rf>0.5.

7. The supersonic aircraft according to claim 6, wherein the exhaust nozzle is one of a plurality of exhaust nozzles designed such that irrespective of the number N of the plurality of projecting sections and the length Rf of the one side of the projecting section, a cross-sectional area of each exhaust port of the plurality of exhaust nozzles is substantially equal to that of each other exhaust port of the plurality of exhaust nozzles.

8. The supersonic aircraft according to claim 3, wherein a sound pressure level of high-frequency components of jet noise due to the exhaust nozzle with the plurality of projecting sections is higher than a sound pressure level of high-frequency components of jet noise due to the exhaust nozzle without the plurality of projecting sections, and wherein a sound pressure level of low-frequency components of jet noise due to the exhaust nozzle with the plurality of projecting sections is lower than a sound pressure level of low-frequency components of jet noise due to the exhaust nozzle without the plurality of projecting sections.

9. The supersonic aircraft according to claim 1, wherein the shield suppresses wrapping of the pressure waves generated by the engine exhaust flow downward around the aircraft to thereby reduce sonic booms due to the engine exhaust flow.

10. The supersonic aircraft according to claim 1, wherein the shield includes a pair of shields disposed on the aircraft so as to sandwich the engine exhaust flow.

11. The supersonic aircraft according to claim 10, further comprising:

a horizontal tail disposed behind the engine nacelle, wherein the pair of shields is disposed on the horizontal tail.

12. The supersonic aircraft according to claim 11, wherein the shield further includes the horizontal tail.

13. The supersonic aircraft according to claim 10, wherein each of the pair of shields is inclined outward from the aircraft.

14. The supersonic aircraft according to claim 10, further comprising an aft fuselage lifting surface provided behind the engine nacelle, wherein the pair of shields is disposed on the aft fuselage lifting surface and has a function as a V tail.

15. The supersonic aircraft according to claim 1, wherein the plurality of main nozzle pieces and coupling nozzle pieces constitute the whole circumference of the exhaust flow path to the rear of the jet engine.

16. The supersonic aircraft according to claim 1, wherein during a supersonic cruise of the supersonic aircraft, the main nozzle pieces are swung outward from the exhaust flow path, and wherein during take-off and landing of the supersonic aircraft, the main nozzle pieces are swung inside the exhaust flow path.

17. A method of reducing sonic booms and jet noise, comprising:

shielding, by a shield, an engine exhaust flow discharged from a jet engine accommodated in an engine nacelle mounted on a fuselage of an supersonic aircraft to thereby reduce sonic booms due to the engine exhaust flow;

generating, by an exhaust nozzle that is provided in an exhaust port of the engine nacelle, a sound source for high-frequency components of jet noise at a position at which the shield is capable of shielding the high-frequency components of jet noise due to the engine exhaust flow, to thereby reduce the high-frequency components of jet noise; and promoting mixing of low-frequency components of jet noise due to the engine exhaust flow with an external air flow to thereby reduce je-noise having-the low-frequency components of jet noise, wherein the exhaust nozzle extends to the rear of the jet engine and constitutes an exhaust flow path, wherein the exhaust nozzle has a plurality of main nozzle pieces and at least one coupling nozzle piece, wherein a rear end portion of each of the main nozzle pieces is provided swingably in an inward and outward direction of the exhaust flow path about an open/close bend section, the open/close bend section being formed at a rear end of a throttle section at the rear of the jet engine, wherein the coupling nozzle piece is disposed between adjacent main nozzle pieces and is coupled bendably to the main nozzle pieces on either side thereof, the coupling nozzle piece being coupled bendably to the main nozzle pieces at a side bend section, and the coupling nozzle piece having a central bend section that is capable of forming a plurality of projecting sections inside the exhaust flow path in conjunction with a movement of each of the main nozzle pieces, wherein, when the main nozzle pieces are swung outward from the exhaust flow path, the coupling nozzle piece forms a flat surface having no projecting section inside the exhaust flow path, and the cross-sectional area of the exhaust flow path is wider toward the rear end portion of the main nozzle pieces from the position of the open/close bend section, and wherein, when the main nozzle pieces are swung inside the exhaust flow path, the coupling nozzle piece forms a projecting section inside the exhaust flow path along the exhaust flow path for narrowing the exhaust flow path.

* * * * *